(12) United States Patent
Dossing

(10) Patent No.: US 10,091,123 B2
(45) Date of Patent: Oct. 2, 2018

(54) SYSTEM AND USER INTERFACE FOR COORDINATING DISTRIBUTED WORKFLOW BETWEEN MULTIPLE COMPUTING SYSTEMS

(71) Applicant: Bank of America Corporation, Charlotte, NC (US)

(72) Inventor: Soren Dossing, Tokyo (JP)

(73) Assignee: Bank of America Corporation, Charlotte, NC (US)

( * ) Notice: Subject to any disclaimer, the term of this patent is extended or adjusted under 35 U.S.C. 154(b) by 177 days.

(21) Appl. No.: 14/967,474

(22) Filed: Dec. 14, 2015

(65) Prior Publication Data

US 2017/0171097 A1 Jun. 15, 2017

(51) Int. Cl.
| | | |
|---|---|---|
| *H04L 12/863* | (2013.01) | |
| *H04L 29/08* | (2006.01) | |
| *G06Q 10/06* | (2012.01) | |
| *G06F 9/48* | (2006.01) | |

(52) U.S. Cl.
CPC .......... *H04L 47/622* (2013.01); *G06F 9/4881* (2013.01); *G06Q 10/06* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 9,141,345 B2* | 9/2015 | Armour | ............... | G06F 8/34 |
| 9,589,250 B2* | 3/2017 | Palanisamy | | |
| 2006/0010025 A1* | 1/2006 | Sattler | ............... | G06Q 10/06 |
| | | | | 705/7.18 |
| 2006/0069605 A1* | 3/2006 | Hatoun | ............... | G06Q 10/06 |
| | | | | 705/7.15 |
| 2009/0171881 A1* | 7/2009 | Gilliam | ............... | G06N 99/005 |
| | | | | 706/50 |
| 2010/0305997 A1* | 12/2010 | Ananian | ............... | G06F 9/5038 |
| | | | | 705/7.27 |
| 2013/0036425 A1* | 2/2013 | Zimmermann | ....... | G06F 9/4881 |
| | | | | 718/106 |
| 2014/0288987 A1* | 9/2014 | Liu | ............... | G06Q 10/06 |
| | | | | 705/7.15 |
| 2016/0103706 A1* | 4/2016 | Novaes | ............... | G06F 9/4881 |
| | | | | 718/102 |
| 2016/0217017 A1* | 7/2016 | Ding | ............... | G06F 9/4881 |

* cited by examiner

*Primary Examiner* — Thomas J Dailey
(74) *Attorney, Agent, or Firm* — Banner & Witcoff, Ltd.; Michael A. Springs

(57) ABSTRACT

Systems and computer-readable media are disclosed for coordinating the distribution of workflow between multiple computing systems. Coordinating the distribution of workflow may include transferring data between multiple distributed computing systems using one or more networks. The workflow may include a series of operations to be executed. Execution of the first operation may be triggered by sending a message or a notification to a first computing system. After receiving a message or notification that execution of the first operation is complete, execution of a second operation may be triggered by sending a message or notification to a second computing device. The first computing device may be different than the second computing device.

20 Claims, 11 Drawing Sheets

| | 702 | 704 | 706 | 708 | 710 | 712 | 714 | 716 |
|---|---|---|---|---|---|---|---|---|
| | Workflow | Request ID | Workflow Status | Current Operation ID | Current Operation Owner | Start Date/Time | Completion Date/Time | Output |
| 701 | Workflow 1 | 1 | Active | Operation 1 | Owner 1 | Date/Time 1 | Date/Time 3 | Output 1 |
| 703 | Workflow 2 | 2 | Complete | N/A | N/A | Date/Time 2 | Date/Time 4 | Output 2 |
| 705 | Workflow 3 | 3 | Pending | N/A | N/A | N/A | N/A | Output 3 |

SYSTEM AND USER INTERFACE FOR COORDINATING DISTRIBUTED WORKFLOW BETWEEN MULTIPLE COMPUTING SYSTEMS

BACKGROUND

Aspects of the disclosure relate to computer hardware and software. In particular, one or more aspects of the disclosure generally relate to coordinating distributed workflow between multiple computing systems.

An enterprise organization may include various teams and interconnected computing systems, including organization devices and servers. Implementation of complex workflows within the enterprise organization may include multiple teams performing multiple operations at different times. Each of the operations may require different data, and in some instances, the same sets of data may be needed to complete different operations. This may result in multiple teams accessing the same set of data, and each team may then independently manipulate the data, resulting in irreconcilable sets of data. Additionally, a first team may begin working on an operation only to discover that data is needed from a second team in order to complete the operation. The first team may then have to wait for the second team to provide the data before completing the operation, thus resulting in additional inefficiencies Therefore, it may be advantageous to create a workflow coordination system that may generate a workflow including one or more operations. The workflow coordination system may utilize a user interface that is displayed on a computing device to generate the workflow. A user may input one or more data elements into the user interface. The computing device may then generate one or more operations for the workflow based on the data elements entered into the user interface. A visualization of the generated workflow, including each operation of the workflow, may be outputted on a display associated with the computing device.

The workflow coordination system may then coordinate execution of a selected workflow between distributed computing systems within the enterprise organization. Coordinating execution of a selected workflow between distributed computing systems may include transferring data among a plurality of distributed computing systems via one or more organization networks. The transferred data may be related to the operations of the selected workflow. Alternatively, the workflow coordination system may store data related to the operations in a central server within the enterprise organization. Each of the one or more operations may be executed by a team at the enterprise organization. Each team may receive any data necessary to complete an operation assigned to the team via a data transfer from the workflow coordination system. Alternatively, each team may access any data necessary to complete an operation assigned to the team from the central server via one or more organization devices and organization networks. Additionally, a team may utilize a computing device to send data (such as a notification or a message) to the workflow coordination system indicating that the team has completed an assigned workflow. The workflow coordination system may coordinate the execution of a workflow among a plurality of distributed computing systems such that the workflow is completed in a minimal amount of time and simultaneously, completed with a minimal amount of data redundancy.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to various systems and techniques that provide effective, efficient, and convenient ways of distributing workflow to multiple computing systems. In at least some aspects, distributing workflow may comprise triggering execution of an operation of the workflow by transferring a notification to a computing device.

Aspects of the disclosure relate to enabling or configuring one or more computer systems of an enterprise organization to receive, from a first computing device and for a workflow, a first operation comprising first operation information and a second operation comprising second operation information. The one or more computer systems of the enterprise organization may store the first operation, the first operation information, the second operation, and the second operation information in a workflow structure that is associated with the workflow and stored in a central server. The one or more computer systems of the enterprise organization may further determine a sequence of execution for the first operation and the second operation based on one or more dependencies between the first operation and the second operation. The one or more computer systems of the enterprise organization may further output visualization data comprising the sequence of execution to the first computing device.

For example, in accordance with one or more aspects of the disclosure, the second operation information may indicate that output data from an execution of the first operation is to be used as input data for an execution of the second operation. The one or more computer systems of the enterprise organization may further determine that the second operation is dependent on the first operation based on the second operation information indicating that output data from the execution of the first operation is to be used as input data for the execution of the second operation.

In accordance with additional aspects of the disclosure, the one or more computer systems of the enterprise organization may trigger an execution of the first operation by sending a first notification or a first message to a second computing device. The one or more computer systems of the enterprise organization may further receive a second notification or a second message from the second computing device indicating that execution of the first operation is complete. The one or more computer systems of the enterprise organization may further trigger, in response to receiving the second notification or the second message, an execution of the second operation by sending a third notification (or message) to a third computing device. In some instances, the second computing device and the third computing device may be different computing devices.

In accordance with additional aspects of the disclosure, the one or more computer systems of the enterprise organization may further receive a third operation comprising third operation information from the first computing device. The one or more computer systems of the enterprise organization may store the third operation and the third operation information in the workflow structure associated with the workflow and stored in the central server. The one or more computer systems of the enterprise organization may determine a re-ordered sequence of execution for the first operation, the second operation, and the third operation based on one or more dependencies between the first operation, the second operation, and the third operation. The one or more computer systems of the enterprise organization may output visualization data comprising the re-ordered sequence of execution to the first computing device.

In some instances, the second operation information may indicate that output data from an execution of the first operation is to be used as input data for an execution of the second operation, and the third operation information may indicate that output data from an execution of the first operation is to be used as input data for an execution of the third operation. The one or more computer systems of the enterprise organization may further determine that the second operation and the third operation are each dependent on the first operation, based on the second operation information indicating that output data from the execution of the first operation is to be used as input data for the execution of the second operation, and further based on the third operation information indicating that output data from the execution of the first operation is to be used as input data for the execution of the third operation. The one or more computer systems of the enterprise organization may further determine that the second operation and the third operation may be executed in parallel, based on the second operation information indicating that output data from the execution of the first operation is to be used as input data for the execution of the second operation, and further based on the third operation information indicating that output data from the execution of the first operation is to be used as input data for the execution of the third operation.

In accordance with one or more embodiments, a system may include at least one processor, a communication interface, and memory storing computer-readable instructions that, when executed by the at least one processor, cause the system to receive, from a first computing device and for a workflow, a first operation comprising first operation information and a second operation comprising second operation information. The memory may store additional computer-readable instructions that, when executed by the at least one processor, further cause the system to store the first operation, the first operation information, the second operation, and the second operation information in a workflow structure that is associated with the workflow and stored in a central server. The memory may store additional computer-readable instructions that, when executed by the at least one processor, further cause the system to determine a sequence of execution for the first operation and the second operation based on one or more dependencies between the first operation and the second operation. The memory may store additional computer-readable instructions that, when executed by the at least one processor, further cause the system to output visualization data comprising the sequence of execution to the first computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 depicts an illustrative control screen that may be displayed on a computing device in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
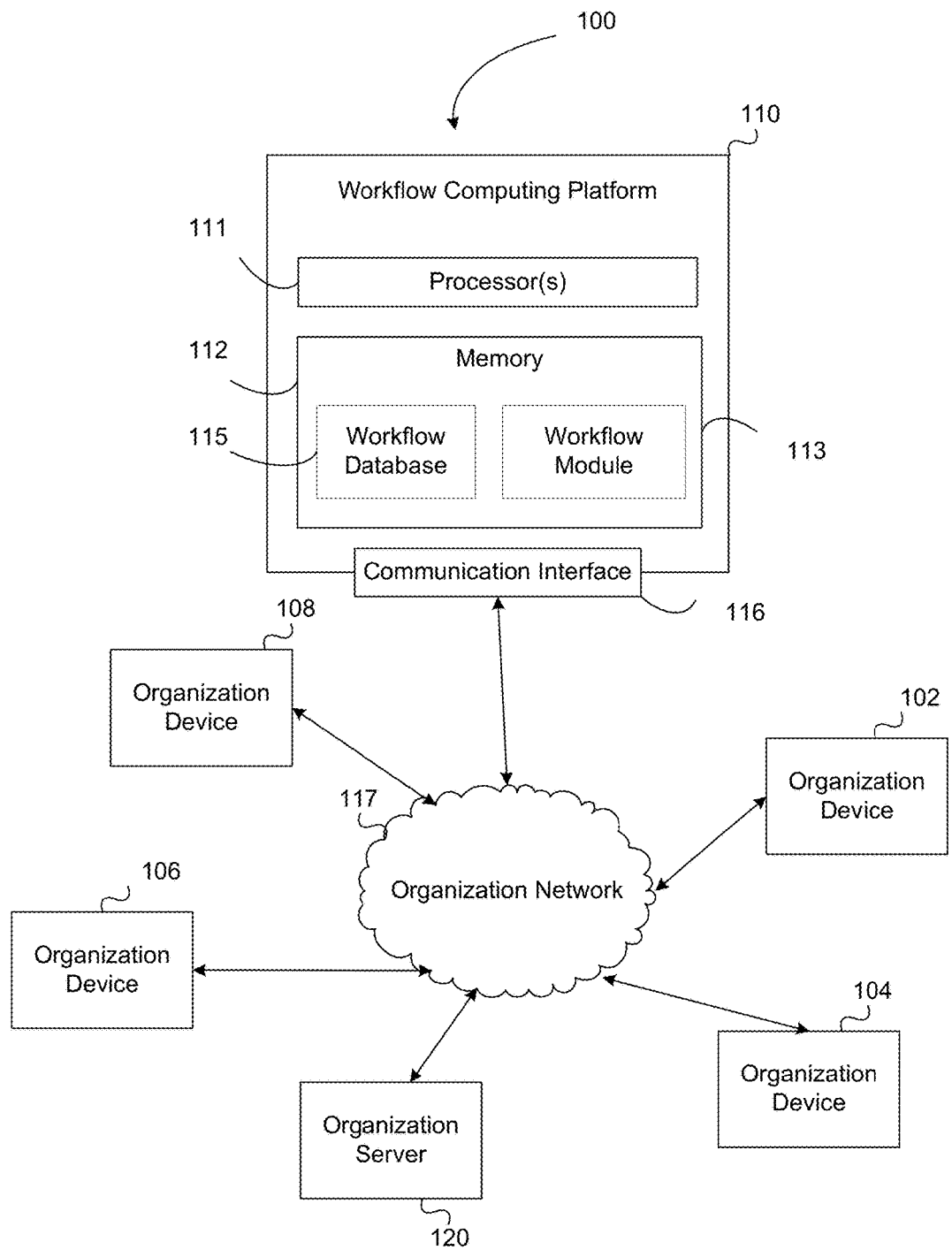
FIG. 1 depicts an illustrative computing environment for creating workflow process structures in accordance with one or more aspects described herein.

FIG. 1 depicts an illustrative computing environment for coordinating execution of a workflow between a plurality of computing systems in accordance with one or more example embodiments. Referring to FIG. 1, computing environment 100 may include one or more computing devices. For example, computing environment 100 may include first organization device 102, second organization device 104, third organization device 106, and fourth organization device 108. First organization device 102, second organization device 104, third organization device 106, and fourth organization device 108 may be used by one or more individuals or teams associated with the enterprise organization. Computing environment 100 may further include organization server 120. Organization server 120 may store information related to one or more workflow process structures.

First organization device 102, second organization device 104, third organization device 106, and fourth organization device 108 may be any type of computing device configured to provide the particular functionality described herein. For instance, any of first organization device 102, second organization device 104, third organization device 106, and/or fourth organization device 108 may be a device configured to receive and/or display a user interface, receive input via the user interface, and communicate the received input to one or more other computing devices. For example, any of first organization device 102, second organization device 104, third organization device 106, and/or fourth organization device 108 may be a server computer, a desktop computer, laptop computer, tablet computer, smart phone, or the like. Any and/or all of first organization device 102, second organization device 104, third organization device 106, and fourth organization device 108 may, in some instances, be special-purpose computing devices configured to perform specific functions.

Computing environment 100 also may include one or more computing platforms. For example, computing environment 100 may include workflow computing platform 110. Workflow computing platform 110 may include one or more computing devices configured to perform one or more of the functions described herein. For example, workflow computing platform 110 may include one or more computers (e.g., laptop computers, desktop computers, servers, server blades, or the like).

Computing environment 100 also may include one or more networks, which may interconnect one or more of workflow computing platform 110, first organization device 102, second organization device 104, third organization device 106, fourth organization device 108, and organization server 120. For example, computing environment 100 may include organization network 117. Organization network 117 may include one or more sub-networks (e.g., LANs, WANs, or the like). Organization network 117 may be associated with a particular organization (e.g., a corporation, enterprise organization, educational institution, governmental institution, or the like) and may interconnect one or more computing devices associated with the organization. For example, workflow computing platform 110, first organization device 102, second organization device 104, third organization device 106, fourth organization device 108, and organization server 120 may be associated with an organization (e.g., an enterprise organization), and organization network 117 may be associated with and/or operated by the organization, and may include one or more networks (e.g., the Internet, LANs, WANs, VPNs, or the like) that interconnect workflow computing platform 110, first organization device 102, second organization device 104, third organization device 106, fourth organization device 108, one or more other computing devices and/or computer systems that are used by, operated by, and/or otherwise associated with the organization.

Workflow computing platform 110 may include one or more processors 111, memory 112, and communication interface 116. A data bus may interconnect processor(s) 111, memory 112, and communication interface 116. Communication interface 116 may be a network interface configured to support communication between workflow computing platform 110 and organization network 117 and/or one or more sub-networks thereof. Memory 112 may include one or more modules having instructions that when executed by processor(s) 111 cause workflow computing platform 110 to perform one or more functions described herein and/or one or more databases that may store and/or otherwise maintain information which may be used by such modules and/or processor(s) 111. For example, memory 112 may include workflow module 113, which may include instructions that when executed by processor(s) 111 cause workflow computing platform 110 to perform one or more functions described herein, such as instructions for receiving a first operation and a second operation for a workflow from a first computing device, storing the first operation and the second operation in a workflow structure associated with the workflow, determining a sequence of execution for the first operation and the second operation, and outputting visualization data comprising the sequence of execution to the first computing device, as illustrated in greater detail below. In addition, memory 112 may include a workflow database 115, which may store one or more workflow process structures, one or more operations structures, and one or more data sets associated with the one or more workflow processes and/or the one or more workflow operations. Workflow database 115 may be a central database that may be accessed by workflow computing platform 110 and additional computing devices associated with the organization, such as first organization device 102, second organization device 104, third organization device 106, and fourth organization device 108.

Figure 2:
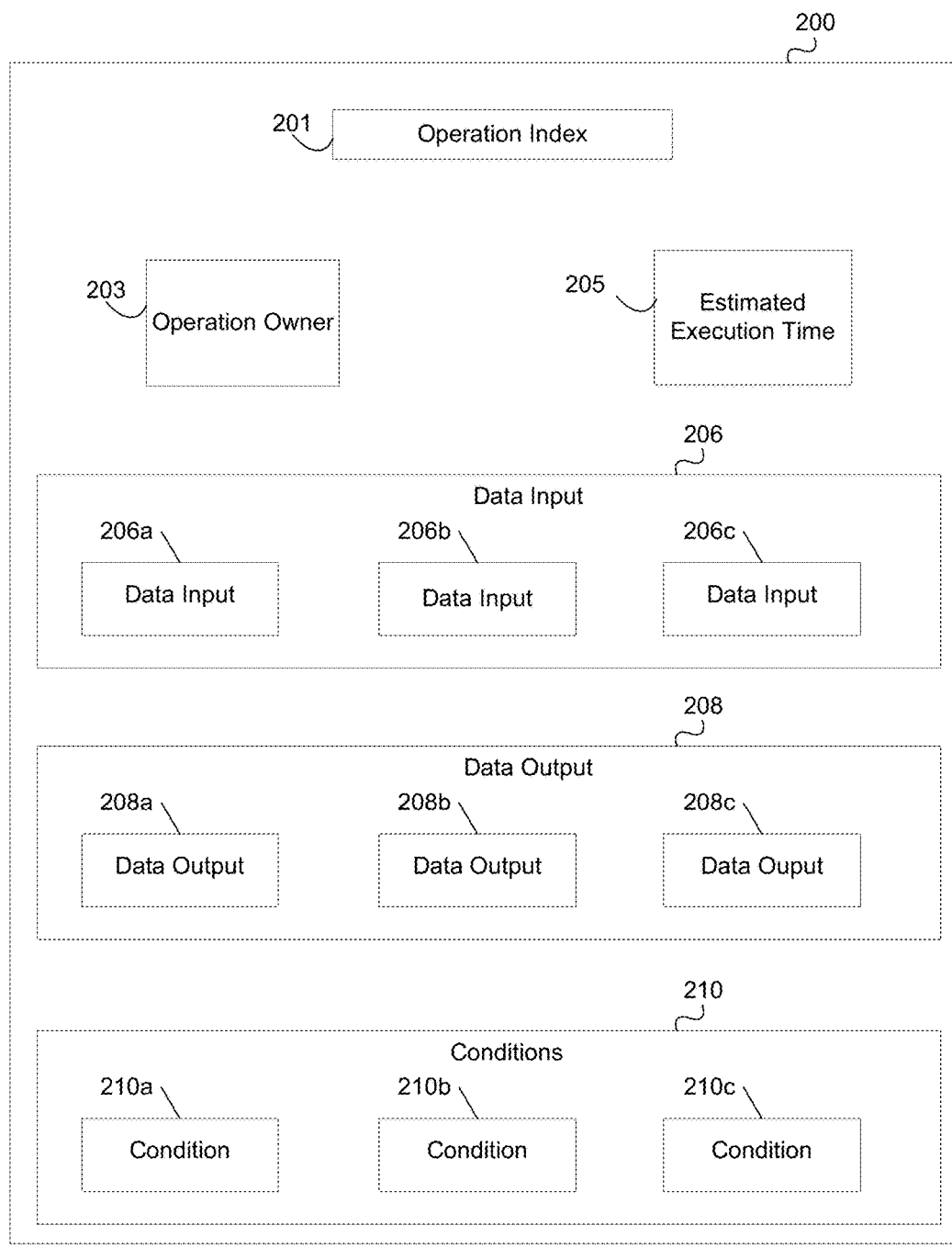
FIG. 2 depicts an illustrative operation structure that may be stored in a workflow database in accordance with one or more aspects described herein.

FIG. 2 depicts an exemplary operation structure 200 that may be stored in the workflow database 115 by workflow computing platform 110. Workflow database 115 may store one or more of the depicted operation structures 200. An operation structure 200 may be selectively added to one or more workflow process structures. Each instance of operation structure 200 may include an operation index 201. Operation index 201 may serve as an identification of each instance of operation structure 200. Each operation index 201 of the plurality of operation structures 200 may be used by workflow database 115 to index the plurality of operation structures 200 that are stored in workflow database 115. Operation index 201 may be an identification number, or may be a description of the operation with which the operation structure 200 is associated, or other unique identifier associated with the operation.

Operation structure 200 may further include data field 203 and data field 205. Data field 203 may indicate an operation owner associated with operation structure 200. An operation owner may be an individual associated with the enterprise organization or a team associated with the enterprise organization. The individual or team may be responsible for completion of the operation associated with operation structure 200. Alternatively, data field 203 may store rules that may be used to determine the operation owner at the time an operation associated with the operation structure 200 is executed. For example, a first rule may indicate that if a first condition is true, the operation owner is to be a first individual associated with the enterprise organization, and a second rule may indicate that if a second condition is true (or, if the first condition is not true), the operation owner is to be a second individual associated with the enterprise organization. The first condition and the second condition may rely on routing input that will be provided prior to or during the execution of the operation associated with the operation structure 200. This is discussed in further detail in reference to FIG. 4A below. Data field 205 may include information identifying the estimated amount of time needed to complete execution of an operation associated with operation structure 200.

Data field 206 may store information indicative of data that must be input before an operation associated with operation structure 200 may be executed. For example, operation structure 200 may be associated with an operation directed to creation of an email account for an employee. Creation of the email account may require two data elements to be input. The first data element may be a name of the employee. The second data element may be the email address to be associated with the email account. In this example, data field 206a may be used to store the name of the employee. Data field 206b may be used to store the email address to be associated with the email account.

Data field 208 of operation structure 200 may store information indicative of data that will be output once an operation associated with operation structure 200 is executed. Data field 208 of operation structure 200 may further store information indicative of the destination of the data that will be output once an operation associated with operation structure 200 is executed. Continuing with the example above, creation of the email account may result in the output of three data elements. The first data element output by operation structure 200 once the email account has been created may be the name of the employee for which the email account has been created. This data element may be output (i.e. stored) in data field 208a of operation structure 200. The second data element output by operation structure 200 once the email account has been created may be the email ID associated with the email account. This data element may be output (i.e. stored) in data field 208b of operation structure 200. The third data element output by operation structure 200 once the email account has been created may be a temporary password associated with the email account. This data element may be output (i.e. stored) in data field 208c of operation structure 200. Once an operation associated with an operation structure 200 is executed as part of a workflow, the output data may be used as input data for a subsequent operation within the workflow. Each of data field 208a, 208b, and 208c may further store the destination for the data stored in that data field.

Data field 210 may store information indicative of conditions that must be satisfied before an operation associated with operation structure 200 may be executed. Continuing with the example above, the enterprise organization may only allow for an employee to be associated with one email account. Therefore, operation structure 200, which as noted above, may be associated with the creation of an email account, may only be executed for an employee that is not already associated with an email account. This condition may be stored in data field 210a. Additional conditions may be stored in data field 210b and data field 210c of operation structure 200.

Figure 3:
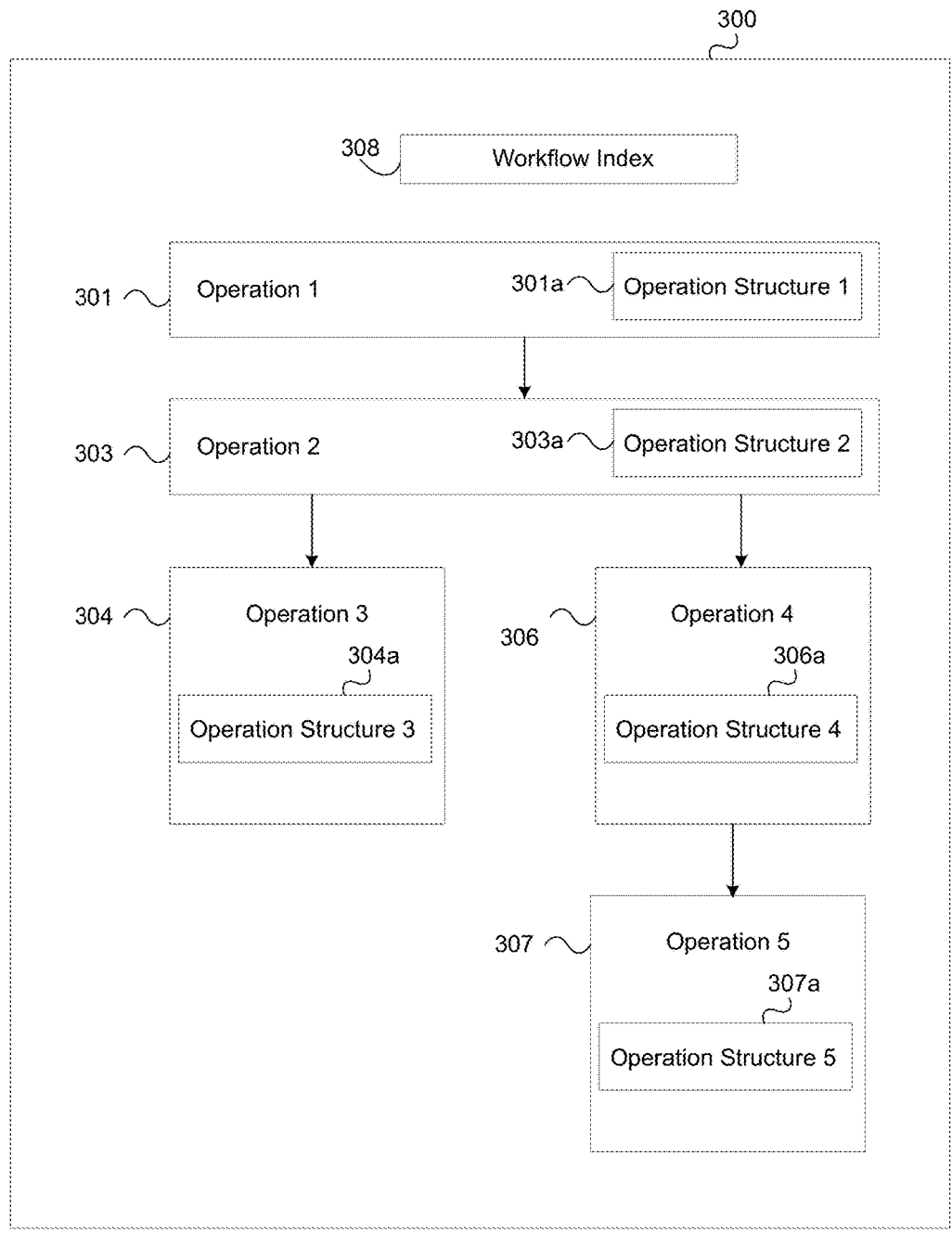
FIG. 3 depicts an illustrative workflow process structure that may be stored in a workflow database in accordance with one or more aspects described herein.

FIG. 3 depicts an exemplary workflow process structure 300 that may be stored in workflow database 115 by workflow computing platform 110. Each instance of workflow process structure 300 may include a workflow index 308. Workflow index 308 may serve as an identification of each instance of workflow process structure 300. Each workflow index 308 of the plurality of workflow process structures 300 may be used by workflow database 115 to index the plurality of workflow process structures 300 that are stored in workflow database 115. Workflow index 308 may be an identification number, or may be a description of the workflow process with which the workflow process structure 300 is associated, or other unique identifier associated with the workflow process structure 300.

Each instance of workflow process structure 300 may further include a series of operations 301-307. Each of operations 301-307 may be associated with an operation structure 200, shown as operation structures 301a-307a. Workflow process structure 300 may include operation 301. Operation 301 is the first operation of workflow process structure 300 and may include operation structure 301a. When workflow process structure 300 is executed, operation 301 will be the first operation to execute. The data elements that are needed for the execution of operation 301 may be stored in operation structure 301a during an instantiation of and prior to an execution of workflow process structure 300. In a first example, if operation 301 requires two data elements in order to execute, data field 206a of operation structure 301a may store a first data element of the required data elements and data field 206b of operation structure 301a may store a second data element of the required data elements.

Workflow process structure 300 may include operation 303. As indicated by the arrow shown in FIG. 3, operation 303 will be executed once operation 301 has completed execution. Operation 303 may include operation structure 303a. Operation 303 may require one or more data elements (to be stored in data field 206 of operation structure 303a) prior to execution of operation 303. In addition, data that is output from any previously executed operations within workflow process structure 300 (here, operation 301), may be used as input data for operation 303. That is, output data stored in data field 208 of operation structure 301a may be used as input data for the execution of operation 303, and may therefore be stored as input data in data field of operation structure 303a.

In a second example, execution of operation 301 may result in a data element stored in data field 208a of operation structure 301a, a data element stored in data field 208b of operation structure 301a, and a data element stored in data field 208c of operation structure 301a. In this second example, execution of operation 303 may not begin until each of data fields 206a-206c of workflow process structure 303a has been propagated with the necessary data elements. In this second example, data field 206c of operation structure 303a may have been propagated with one or more data elements prior to execution of workflow process structure 300 (i.e. prior to execution of any operations within workflow process structure 300). Once operation 301 of workflow process structure 300 has completed execution, the data element stored in data field 208a of operation structure 301a may be transferred to and stored in data field 206a of operation structure 303a, and the data element stored in data field 208b of operation structure 301a may be transferred to and stored in data field 206b of operation structure 303a. Operation 303 may then be executed.

Workflow process structure 300 may include operations 304 and 306. Operations 304 and 306 may begin executing in parallel once execution of operation 303 has completed. Operation 304 may include operation structure 304a. Operation 306 may include operation structure 306a. Output data from any previously executed operations within workflow process structure 300 (here, operations 301 and 303), may be used as input data for operations 304 and/or 306. Additionally, or alternatively, input data for operations 304 and 306 may be stored in within operation structures 304a and 306a, respectively, prior to execution of workflow process structure 300.

In a third example, execution of operation 301 may result in a first data element stored in data field 208a of operation structure 301a, and a second data element stored in data field 208b of operation structure 301a. Execution of operation 303 may result in a first data element stored in data field 208a of operation structure 303a, and a second data element stored in data field 208b of operation structure 303a. As noted above, data elements stored in data field 208 of operation structure 200 represent data elements that are output as a result of operation structure 200 being executed.

In this third example, output data from operations 301 and 303 may both be used as input data of operation 304. The first data element stored in data field 208a of operation structure 301a may be transferred to and stored in data field 206a of operation structure 304a. The first data element stored in data field 208a of operation structure 303a may be transferred to and stored in data field 206b of operation structure 304a. The second data element stored in data field 208b of operation structure 303a may be transferred to and stored in data field 206c of operation structure 304a.

Further in this third example, output data from operations 301 and 303 may be used as input data of operation 306. The second data element stored in data field 208b of operation structure 301a may be transferred to and stored in data field 206a of operation structure 306a. The first data element stored in data field 208a of operation structure 303a may be transferred to and stored in data field 206b of operation structure 306a. The execution of operations 304 and 306 may then begin in parallel.

Workflow process structure 300 may further include operation 307. Operation 307 may include operation structure 307a. Operation 307 may execute once operation 306 has completed execution. Output data from any previously executed operations within workflow process structure 300 (here, operations 301, 303, 304, and 306), may be used as input data for operation 307. Additionally, or alternatively, input data for operation 307 may be stored in within operation structure 307a prior to execution of workflow process structure 300.

In a fourth example, execution of operation 301 may result in a first data element stored in data field 208a of operation structure 301a, and a second data element stored in data field 208b of operation structure 301a. Execution of operation 303 may result in a first data element stored in data field 208a of operation structure 303a, and a second data element stored in data field 208b of operation structure 303a. Execution of operation 306 may result in a first data element stored in data field 208a of operation structure 306a. As noted above, data elements stored in data field 208 of operation structure 200 represent data elements that are output as a result of operation structure 200 being executed.

In this fourth example, operation structure 307a may require four data elements prior to execution. The first required data element may be stored in field 206a of operation structure 307a prior to execution of workflow process structure 300. The second required data element may be transferred from data field 208a of operation structure 301a and stored in data field 206b of operation structure 307b. The third required data element may be transferred from data field 208a of operation structure 303a and stored in data field 206c of operation structure 307a. The fourth required data element may be transferred from data field 208a of operation structure 306a and stored in data field 206d (not shown) of operation structure 307a. Operation 307 may then execute. Operation 307 is the last operation of workflow process structure 300. Therefore, once operation 307 completes execution, the execution of workflow process structure 300 ends.

Figure 4A:
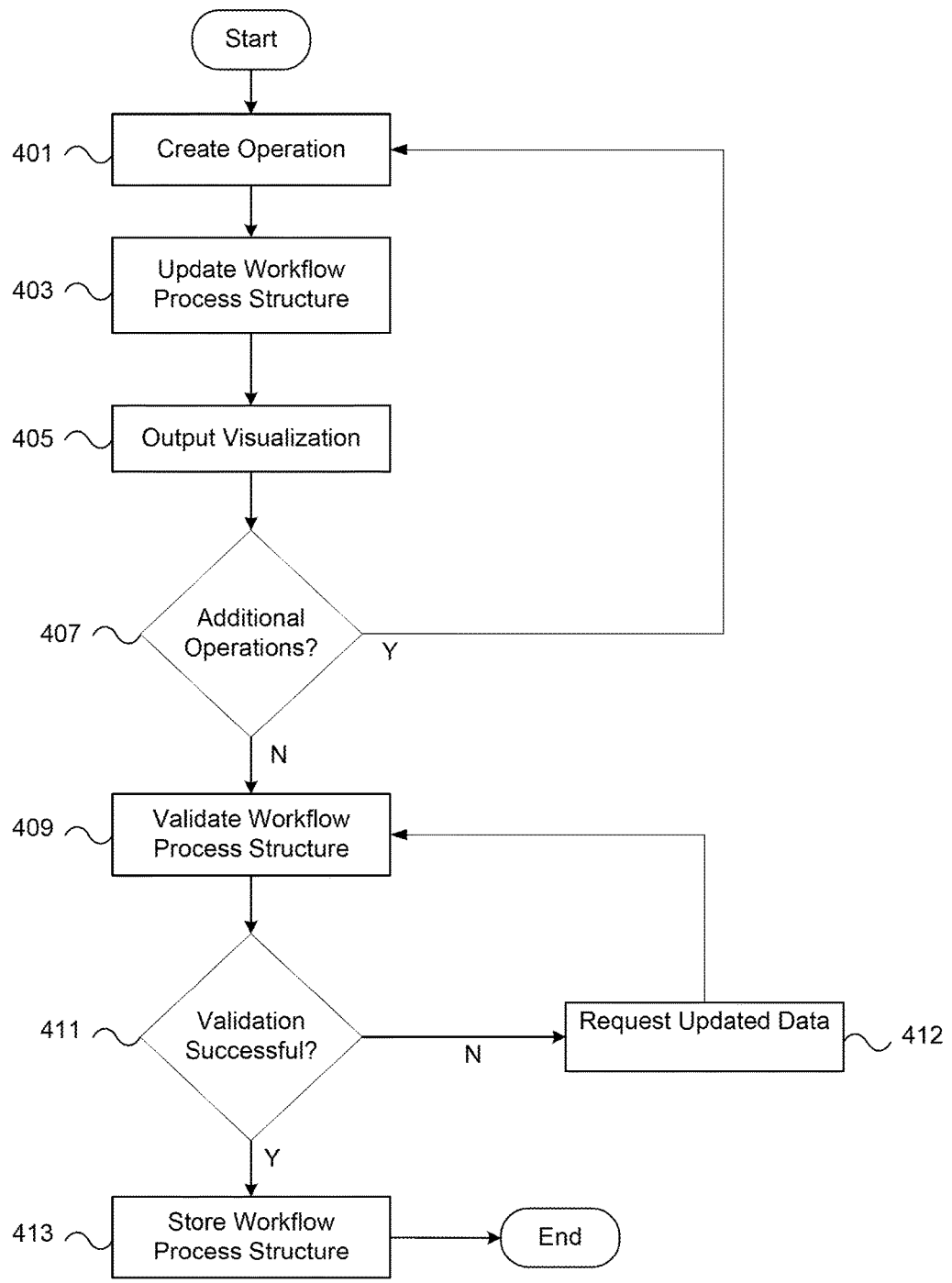
FIG. 4A depicts an illustrative method for creating a workflow process structure in accordance with one or more aspects described herein.

FIG. 4A is an illustrative method for creating a workflow process structure via workflow computing platform 110. As noted above, an organization device may be a device configured to receive and/or display a user interface, receive input via the user interface, and communicate the received input to one or more other computing devices. The workflow process structure may be created via a first user interface presented on an organization device by workflow computing platform 110. The organization device may be first organization device 102. First organization device 102 may be a server computer, a desktop computer, laptop computer, tablet computer, smart phone, or the like.

At step 401, an operation for the workflow process structure is created via the first user interface presented on the first organization device 102 by workflow computing platform 110. Creation of the operation may include creating an operation structure that is associated with the operation. Creating an operation structure may include instantiating an operation structure 200 that is stored in workflow database 115. Alternatively, a new operation structure 200 can be created. One or more data fields of the operation structure 200 may be propagated based on the data inputted via the user interface. For example, an operation owner may be stored in data field 203 of operation structure 200. One or more data elements may be stored in data field 206 of the operation structure 200 associated with the created operation. If inputs to the created operation are dependent on the outputs of a different operation, the source of the input data may be stored in the created operation. Information specifying the data outputs that are to be output when the operation is executed may be specified. Additionally, one or more conditions may be in stored data field 210 of operation structure 200 associated with the created operation.

If one or more of the data outputs of the operation are to be input to one or more additional operations, the destination (s) of the output data may be stored in the operation. Within a workflow, output data from a first operation may be used as input data for one or more subsequent operations within the workflow. As discussed above in reference to FIG. 2, data field 208 of an operation structure 200 may store output data and information indicative of the destination of the output data. Therefore, within a workflow, the operation structure 200 associated with each operation stores information indicative of how the data produced from that operation is utilized by other operations within the workflow.

In a first instance, output data stored in data field 208 of a first operation structure 200 associated with a first operation may be stored as input data in data field 206 of a second operation structure 200 associated with a second operation, and may subsequently be used as display data in the second operation. That is, when the second operation is executed, the input data in data field 206 of the second operation structure (received from data field 208 of the first operation structure) may be sent to a computing device associated with an operation owner of the second operation. When completing the second operation, the operation owner may view the input data that was stored in data field 206 of the second operation structure on a display associated with the computing device. The operation owner may utilize the displayed input data to complete the second operation.

In a second instance, output data stored in data field 208 of a first operation structure 200 associated with a first operation may be stored as input data in data field 206 of a second operation structure 200 associated with a second operation, and may subsequently be used to evaluate a condition stored in data field 210 of the second operation structure 200. As discussed above in reference to FIG. 2, an operation structure 200 may store one or more conditions in data field 210. In this second instance, output data stored in data field 208 of the first operation structure 200 may be stored as input data in data field 206 of the second operation structure 200. When the second operation is executed, the input data stored in data field 206 of the second operation structure 200 may be used to evaluate a condition stored in data field 210 of the second operation structure 200.

In a third instance, output data stored in data field 208 of a first operation structure 200 associated with a first operation may be stored as input data in data field 206 of a second operation structure 200 associated with a second operation, and may subsequently be used as routing input for the second operation structure 200 associated with the second operation. As discussed above in reference to FIG. 2, data field 203 of an operation structure 200 may store rules that may be used to determine the operation owner at the time an operation associated with the operation structure 200 is executed. For example, a first rule may indicate that if a first condition is true, the operation owner is to be a first individual associated with the enterprise organization, and a second rule may indicate that if the first condition is not true, the operation owner is to be a second individual associated with the enterprise organization. The first condition may rely on routing input that will be provided prior to or during the execution of the operation associated with the operation structure 200. In this third instance, output data stored in data field 208 of the first operation structure 200 may be stored as input data in data field 206 of the second operation structure 200. When the second operation executes, the input data in data field 206 of the second operation structure 200 may be used to determine whether the first condition in data field 203 of the second operation structure is true or false. The evaluation of the first condition may be used to determine whether the first individual or the second individual is to be the operation owner of the second operation.

Therefore, if one or more of the data outputs of the operation are to be input to one or more additional operations, the destination(s) of each of the output data may be stored in the operation at the time the operation is created. The created operation and associated operation structure 200 associated with the created operation may then be stored in workflow database 115 by workflow computing platform 110.

Figure 4B:
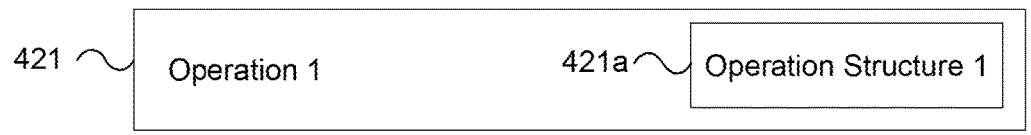
FIGS. 4B-4G depict illustrative visualizations of workflow process structures in accordance with one or more example embodiments.

In a first example, a user may create, at step 401 and via a user interface presented by workflow computing platform 110 on first organization device 102, a first operation 421 (shown in FIG. 4B). As part of creating first operation 421, a user may create an operation structure 421a that is associated with first operation 421. Creation of operation structure may include propagating one or more of the data fields of operation structure 421a. In this first example, data field 203 of operation structure 421a may be propagated with a first operation owner. Workflow computing platform 110 may then store first operation 421 and associated operation structure 421a.

With further reference to FIG. 4A, processing may then proceed to step 403, where workflow computing platform 110 may update the workflow process structure. Updating the workflow process structure may include analyzing data dependencies between the operations in the workflow process structure. A first operation may be dependent on a second operation if output data from the second data is used as input data for the first operation. Workflow computing platform 110 may analyze each operation of the workflow process structure to determine if any sources of the one or more input data for that operation is an output of another operation within the workflow process structure. Similarly, workflow computing platform 110 may analyze each operation of the workflow process structure to determine if the output data for that operation is to be the source of input data for another operation. Based on an analysis of the dependencies, workflow computing platform 110 may determine a proper sequence for execution of the operations in the workflow process structure. By updating the workflow process structure 300 each time a new operation is added to the workflow process structure 300, workflow computing platform 110 optimizes the workflow such that it can be completed in a minimal amount of time. Continuing with the first example, workflow computing platform 110 may determine that there are no dependencies within the workflow process structure, as the workflow process structure only includes one operation (first operation 421 in FIG. 4B).

At step 405, a visualization of the workflow process structure may be provided by workflow computing platform 110 via a second user interface on first organization device 102. The second user interface may the same as the first user interface, or may be a separate user interface. The visualization of the workflow process may include a sequential visualization of the operations in the workflow process structure. The visualization of each operation may include a visualization of the operation structure associated with that operation. The visualization of each operation may additionally or alternatively include a listing of the source of each input data needed for that operation and of the destination of each output data generated by that operation.

FIG. 4B illustrates an example visualization provided by workflow computing platform 110 on first organization device 102 after first operation 421 has been created in the first example. The visualization displays first operation 421 and operation structure 421a, which is associated with first operation 421. Information identifying the source of input data for first operation 421 and/or the destination of output data for first operation 421 may also be displayed within the displayed operation (not shown).

Returning to FIG. 4A, at step 407, workflow computing platform 110 may determine whether additional operations will be added to the workflow process structure. In this first example, workflow computing platform 110 may determine, at step 407, that there are additional operations to be added to the workflow process structure. Processing may then return to step 401. In this first example, at step 401, the user may create, via the user interface presented by workflow computing platform 110 on first organization device 102, a second operation 423 (shown in FIG. 4C). As part of creating second operation 423, the user may create an operation structure 423a that is associated with second operation 423. Creation of operation structure may include propagating one or more of the data fields of operation structure 423a. In this first example, data field 203 of operation structure 423a may be propagated with a second operation owner. The second operation owner may be different than or the same as the first operation owner that is stored in data field 203 of operation structure 421a. As part of creating second operation 423, the user may further specify, within second operation 423, that the source for input data 206a of operation structure 423a is output data 208a of operation structure 421a. Workflow computing platform 110 may then store the second operation 423 and the operation structure 423a within workflow database 115.

With further reference to FIG. 4A, at step 403, workflow computing platform 110 may then update the workflow process structure in this first example. Workflow computing platform 110 may analyze first operation 421 and second operation 423. In the analysis of second operation 423, workflow computing platform 110 may determine that the user has specified that the source for input data 206a of operation structure 423a is output data 208a of operation structure 421a. Thus, workflow computing platform 110 may determine that first operation 421 must be executed prior to the execution of second operation 423, as second operation 423 is dependent on first operation 421.

Figure 4C:
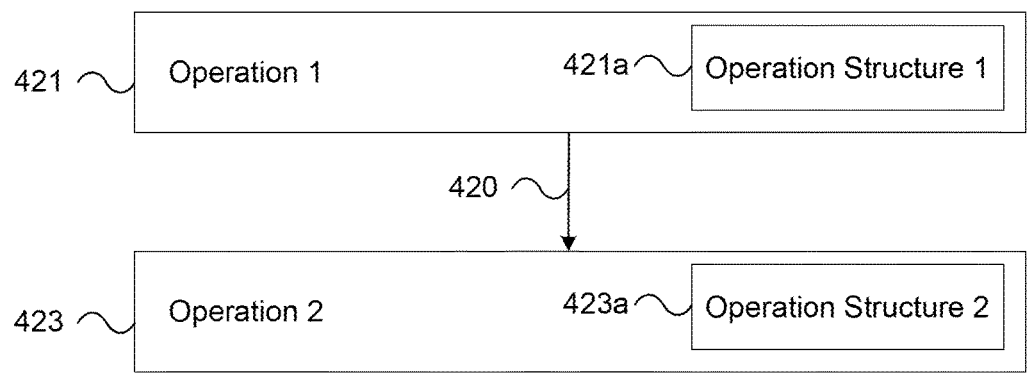

At step 405, workflow computing platform 110 may update the visualization of the workflow process structure in this first example. Workflow computing platform 110 may update the visualization of the workflow process structure based on the creation of second operation 423 at step 401 and the analysis of the workflow process structure at step 403. FIG. 4C illustrates an example visualization provided by workflow computing platform 110 on first organization device 102 after second operation 423 has been added to the workflow process structure in this first example. The visualization displays first operation 421 and associated operation structure 421a. The visualization further displays second operation 423 and associated operation structure 423a. Information identifying the source of input data for first operation 421 and/or second operation 423 may also be displayed within the displayed operations (not shown). Information identifying the destination of output data for first operation 421 and/or second operation 423 may also be displayed within the displayed operations (not shown). The visualization further indicates, via arrow 420, that first operation 421 is executed before second operation 423.

Returning to FIG. 4A, at step 407, workflow computing platform 110 may determine whether additional operations will be added to the workflow process structure. In this first example, workflow computing platform 110 may determine, at step 407, that there are additional operations to be added to the workflow process structure. Processing may then return to step 401. In this first example, at step 401, the user may create, via the user interface presented by workflow computing platform 110 on first organization device 102, a third operation 425 (shown in FIG. 4D). As part of creating third operation 425, the user may create an operation structure 425a that is associated with third operation 425. Creation of operation structure may include propagating one or more of the data fields of operation structure 425a. In this first example, a third operation owner may be stored in data field 203 of operation structure 425a. The third operation owner stored in data field 203 of operation structure 425a may be the same as or different than the first operation owner stored in data field 203 of operation structure 421a. The third operation owner stored in data field 203 of operation structure 425a may be the same as or different than the second operation owner stored in data field 203 of operation structure 423a. As part of creating third operation 425, the user may further specify, within third operation 425, that the source for input data 206a of operation structure 425a is output data 208b of operation structure 421a. Workflow computing platform 110 may then store third operation 425 and operation structure 425a within workflow database 115.

At step 403, workflow computing platform 110 may then update the workflow process structure. In this first example, workflow computing platform 110 may analyze the dependencies of operations 421, 423, and 425. Workflow computing platform 110 may previously have determined that second operation 423 is dependent from first operation 421 (as indicated above, the user has specified that the source for input data 206a of operation structure 423a is output data 208a of operation structure 421a). In the analysis of third operation 425, workflow computing platform 110 may determine that the user has specified that the source for input data 206a of operation structure 425a is output data 208b of operation structure 421a. Thus, workflow computing platform 110 may determine that first operation 421 must be executed prior to the execution of third operation 425. Workflow computing platform 110 may further determine that second operation 423 and third operation 425 do not depend on each other for either input data or output data. Therefore, workflow computing platform 110 may determine that once first operation 421 has completed execution, second operation 423 and third operation 425 may begin execution in parallel.

At step 405, workflow computing platform 110 may update the visualization of the workflow process structure.

Figure 4D:
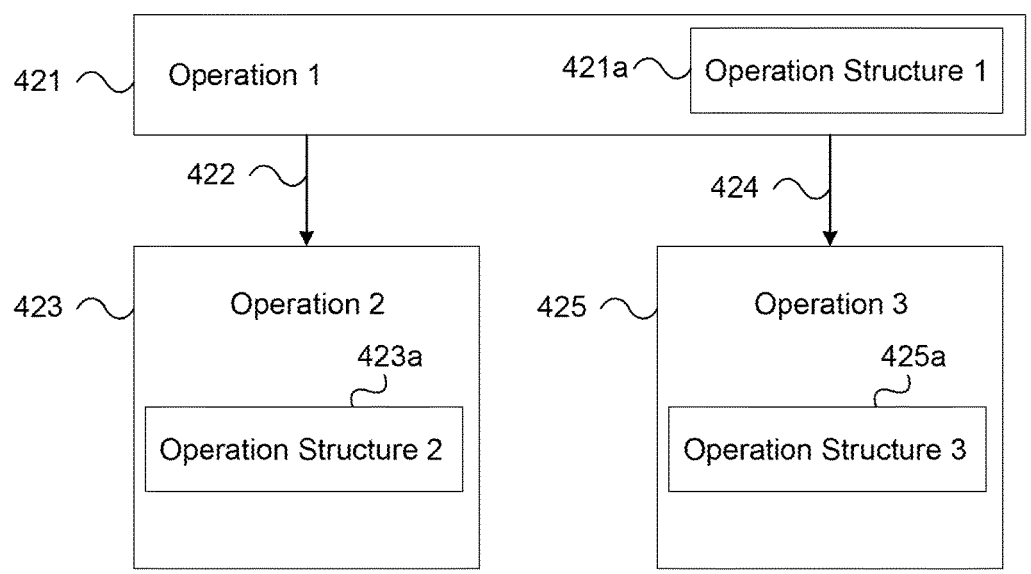

In this first example, workflow computing platform 110 may update the visualization of the workflow process structure based on the creation of third operation 425 at step 401 and the analysis of the workflow process structure at step 403. FIG. 4D illustrates an example visualization provided by workflow computing platform 110 on first organization device 102 after third operation 425 has been added to the workflow process structure in this first example. The visualization displays first operation 421 and associated operation structure 421a. The visualization further displays second operation 423 and associated operation structure 423a. The visualization further displays third operation 425 and associated operation structure 425a. Information identifying the source of input data for operations 421, 423, and/or 425 may also be displayed within the displayed operations (not shown). Information identifying the destination of output data for operations 421, 423, and/or 425 may additionally or alternatively be displayed within the displayed operations (not shown). The visualization further indicates, via arrows 422 and 424, that first operation 421 is executed before each of second operation 423 and third operation 425, and that second operation 423 and third operation 425 begin execution in parallel once execution of first operation 421 is complete.

Returning to FIG. 4A, workflow computing platform 110 may determine, at step 407, that no additional operations are to be added to the workflow process structure. Workflow computing platform 110 may, at step 409, validate the workflow process structure. Validation for the workflow process structure may include verifying that the required input data for each operation structure of each operation within the workflow process structure is specified by the user or alternatively, that the source for each required input data for each operation structure of each operation within the workflow process structure is specified by the user. If the user has specified a source for a required input data for an operation structure of a first operation within the workflow process structure, workflow computing platform 110 may verify that the source is valid (i.e. that a second operation within the workflow process structure will produce the output data that is to be the input data for the first operation.) Once the workflow process structure 300 has been successfully validated, workflow computing platform 110 may store the workflow process structure 300 in workflow database 115.

If, at step 411, workflow computing platform 110 determines that validation of the workflow process structure is successful, workflow computing platform 110 may store the created workflow process structure within workflow database 115 in step 413. If, at step 411, workflow computing platform 110 determines that validation of the workflow process structure is not successful, workflow computing platform 110 may request additional data from the user in step 412.

Figure 4E:
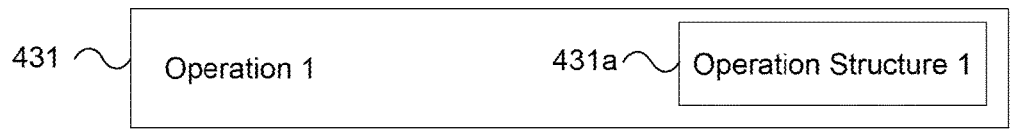

In a second example, a user may create, at step 401 and via a user interface presented by workflow computing platform 110 on first organization device 102, a first operation 431 (shown in FIG. 4E). As part of creating first operation 431, a user may create an operation structure 431a that is associated with first operation 431. Creation of operation structure may include propagating one or more of the data fields of operation structure 431a. Workflow computing platform 110 may then store first operation 431 and associated operation structure 431a.

In this second example, processing may then proceed to step 403, where workflow computing platform 110 may update the workflow process structure. Workflow computing platform 110 may determine that there are no dependencies within the workflow process structure, as the workflow process structure only includes one operation (first operation 431). In this second example, processing may then proceed to step 405, where workflow computing platform 110 may update the visualization of the workflow process structure. FIG. 4E illustrates an example visualization provided by workflow computing platform 110 on first organization device 102 after first operation 431 has been created in the second example. The visualization displays first operation 431 and operation structure 431a, which is associated with first operation 431. Information identifying the source of input data for first operation 431 and/or the destination of output data for first operation 431 may also be displayed within the displayed first operation 431 (not shown).

Returning to FIG. 4A, in this second example, at step 407, workflow computing platform 110 may determine at step 407, that there are additional operations to be added to the workflow process structure. Processing may then return to step 401. In this second example, at step 401, the user may create, via the user interface, a second operation 433 (shown in FIG. 4F). As part of creating second operation 433, the user may create an operation structure 433a that is associated with second operation 433. Creation of operation structure 433a may include propagating one or more of the data fields of operation structure 433a. As part of creating second operation 433, the user may further specify, within second operation 433, that the source for input data 206a of operation structure 433a is output data 208a of operation structure 431a. Workflow computing platform 110 may then store second operation 433 and operation structure 433a within workflow database 115.

Workflow computing platform 110 may, at step 403, update the workflow process structure. Workflow computing platform 110 may analyze operations 431 and 433. In the analysis of second operation 433, workflow computing platform 110 may determine that the user has specified that the source for input data 206a of operation structure 433a is output data 208a of operation structure 431a. Thus, workflow computing platform 110 may determine that first operation 431 must be executed prior to the execution of second operation 433.

Figure 4F:
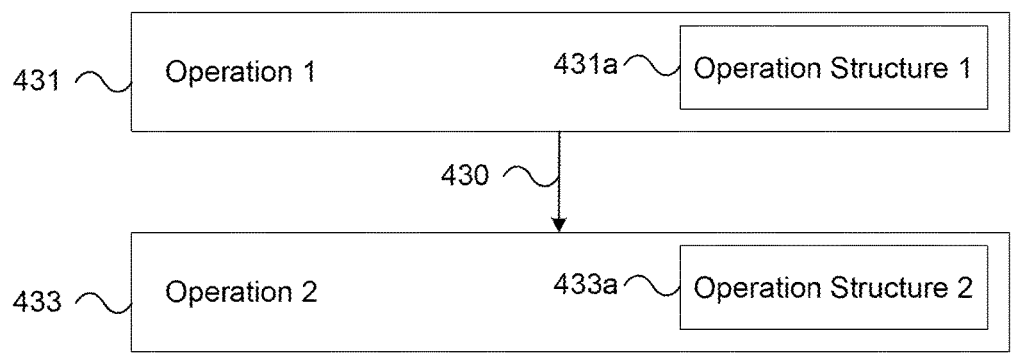

In this second example, at step 405, workflow computing platform 110 may update the visualization of the workflow process structure. Workflow computing platform 110 may update the visualization of the workflow process structure based on the creation of second operation 433 at step 401 and the analysis of the workflow process structure at step 403. FIG. 4F illustrates an example visualization provided by workflow computing platform 110 on first organization device 102 after second operation 433 has been added to the workflow process structure in this second example. The visualization displays first operation 431 and associated operation structure 431a. The visualization further displays second operation 433 and associated operation structure 433a. Information identifying the source of input data for first operation 431 and/or second operation 433 may also be displayed within the displayed operations (not shown). Information identifying the destination of output data for first operation 431 and/or second operation 433 may also be displayed within the displayed operation (not shown). The visualization further indicates, via arrow 430, that first operation 431 is executed before second operation 433.

Returning to FIG. 4A, in this second example, workflow computing platform 110 may, at step 407, determine that there are additional operations to be added to the workflow process structure. Processing may then return to step 401. In this second example, at step 401, the user may create, via the user interface presented by workflow computing platform 110 on first organization device 102, a third operation 432 (shown in FIG. 4G). As part of creating third operation 432, the user may create an operation structure 432a that is associated with third operation 432. Creation of operation structure may include propagating one or more of the data fields of operation structure 432a. As part of creating third operation 432, the user may further specify, within third operation 432, that the source for input data 206a of operation structure 432a is output data 208b of operation structure 431a. As part of creating third operation 432, the user may further specify, within third operation 432, that the destination for output data 208a of operation structure 432a is input data 206b of operation structure 433a. Workflow computing platform 110 may then store third operation 432 and operation structure 432a within workflow database 115.

In this second example, workflow computing platform 110 may, at step 403, then update the workflow process structure. In this second example, workflow computing platform 110 may analyze first operation 431, second operation 433, and third operation 432. Workflow computing platform 110 may previously have determined that second operation 433 is dependent from first operation 431 (as indicated above, the user has specified that the source for input data 206a of operation structure 433a is output data 208a of operation structure 431a). In the analysis of third operation 432, workflow computing platform 110 may determine that the user has specified that the source for input data 206a of operation structure 432a is output data 208b of operation structure 431a, and may further determine that the destination for output data 208a of operation structure 432a is input data 206b of operation structure 433a. Accordingly, workflow computing platform 110 may determine that based on these dependencies, first operation 431 must be executed prior to the execution of third operation 432 and prior to the execution of second operation 433. Workflow computing platform 110 may further determine that based on these dependencies, third operation 432 must be executed prior to the execution of second operation 433.

Figure 4G:
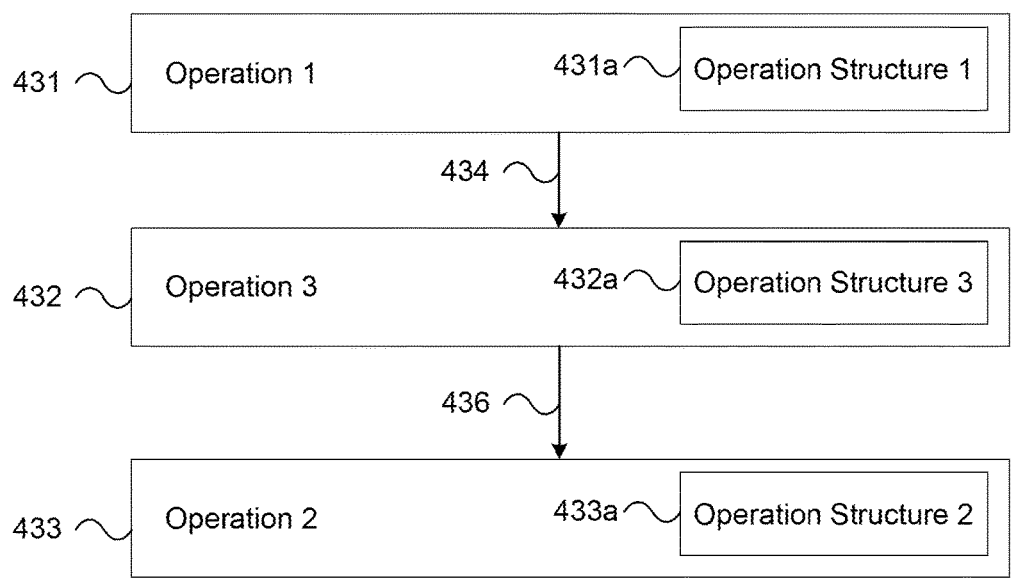

In this second example, workflow computing platform 110 may, at step 405, update the visualization of the workflow process structure. Workflow computing platform 110 may update the visualization of the workflow process structure based on the creation of third operation 432 at step 401 and the updated analysis of the workflow process structure at step 403. FIG. 4G illustrates an example visualization provided by workflow computing platform 110 on first organization device 102 after third operation 432 has been added to the workflow process structure in this second example. The visualization displays first operation 431 and associated operation structure 431a. The visualization further displays second operation 433 and associated operation structure 433a. The visualization further displays third operation 432 and operation structure associated 432a. Information identifying the source of input data for first operation 431, second operation 433, and/or third operation 432, may also be displayed within the displayed operations (not shown). Information identifying the destination of output data for first operation 431, second operation 433, and/or third operation 432, may additionally or alternatively be displayed within the displayed operations (not shown). The visualization further indicates, via arrow 434, that first operation 431 is executed before third operation 432. The visualization further indicates, via arrows 434 and 436, that third operation 432 is executed subsequent to the execution of first operation 431, and prior to the execution of second operation 433.

Returning to FIG. 4A, in this second example, workflow computing platform 110 may, at step 407, determine that no additional operations are to be added to the workflow process structure. Workflow computing platform 110 may then, at step 409, validate the workflow process structure. Workflow computing platform 110 may determine, at step 411, that validation of the workflow process structure has been successful. At step 413, workflow computing platform 110 may store the validated workflow process structure.

By iteratively adding operations to the workflow structure, updating the workflow structure by analyzing the dependencies of the workflow structure, and outputting an updated visualization, workflow computing platform 110 allows for incremental creation of a workflow process structure. This allows a user to visualize the effects of adding each operation to a workflow structure, thereby effectively allowing a user to perform what-if simulation on the creation of a workflow process structure.

Figure 5:
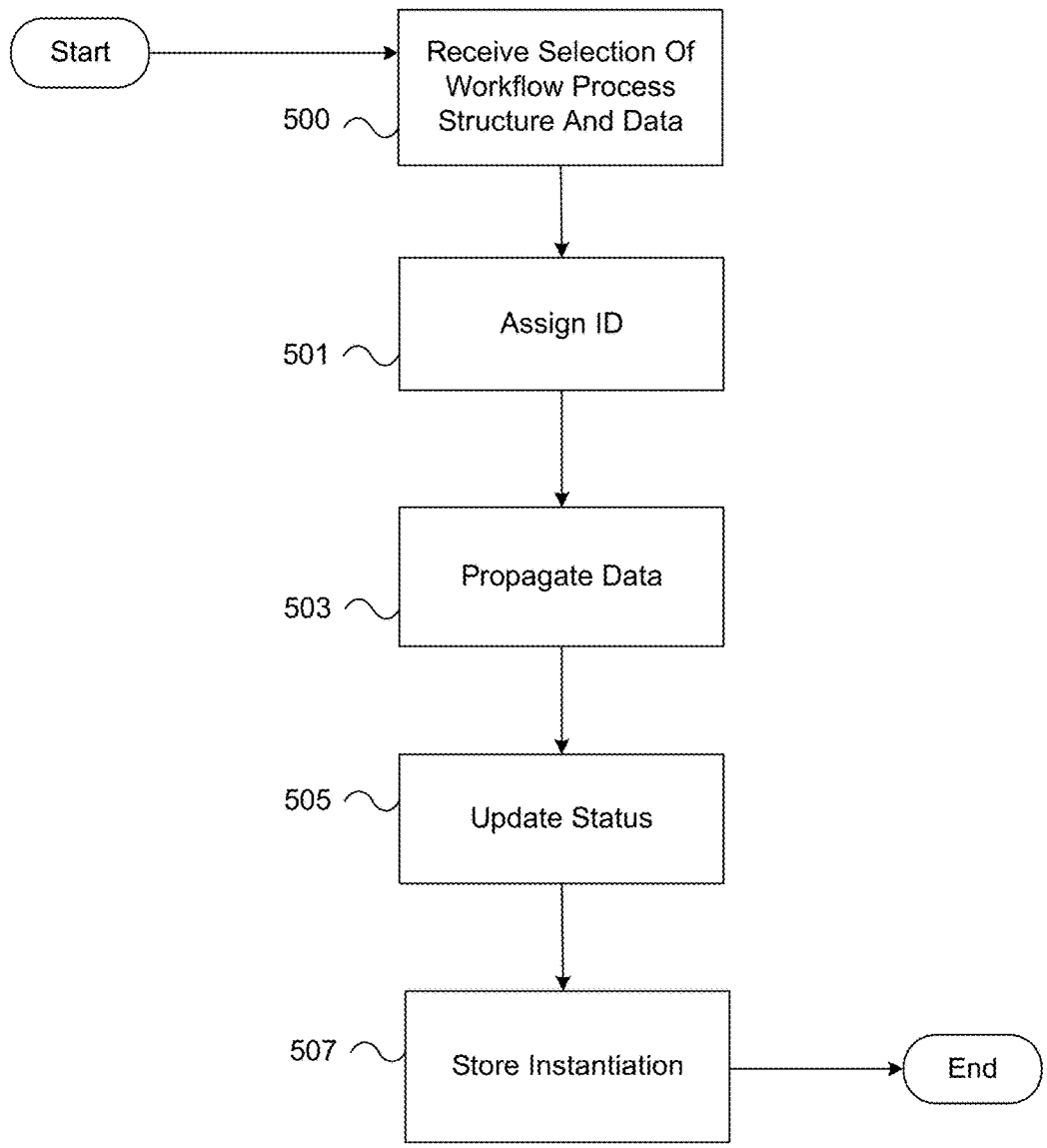
FIG. 5 depicts an illustrative method for instantiating a workflow process structure in accordance with one or more aspects described herein.

FIG. 5 depicts an illustrative method for instantiating a workflow process structure 300. Multiple workflow process structures 300 may be created and stored in workflow database 115. Each workflow process structure 300 may include one or more operations, and the one or more operations may each be associated with an operation structure 200. A user may select to instantiate and execute a workflow process structure 300 from workflow database 115. For example, a first workflow process structure 300 may be instantiated and executed every time a new employee is brought in to the enterprise organization. In this example, operations of the workflow process structure may include a first operation directed to the physical installation of a PC for the new employee. A second operation may be directed to the creation of an email account for the new employee. A third operation may be directed to the creation of a user name and password for the PC installed for the new employee. A fourth operation may be directed to configuring the PC with the email account, user name, and password assigned to the new employee.

In a second example, a second workflow process structure 300 may be instantiated and executed every time a new application is to be hosted by a server of the enterprise organization. A first operation may be selecting the server that will be hosting the new application. A second operation may be installing the new application on the selected server. A third operation may be configuring one or more network related parameters, such as parameters related to load balancing, bandwidth usage, security, and storage.

In a third example, a third workflow process structure 300 may be instantiated and executed each time a hardware device is to be installed in a data center associated with the enterprise organization. A first operation may be directed to the purchasing of the hardware device. A second operation may be directed to the shipping of the hardware device. A third operation may be directed to allocating rack space within the data center for the hardware device. A fourth operation may be directed to installing and routing cables within the allocated rack space for the hardware device. A fifth operation may be directed to installing the hardware device in the allocated rack space. A sixth operation may be directed to powering the installed hardware device. A seventh operation may be directed to performing one or more diagnostic tests on the installed hardware device.

In a fourth example, a fourth workflow process structure 300 may be instantiated and executed each time a hardware device is to be removed from a data center associated with the enterprise organization. A first operation may be directed to physically removing the hardware device from the allocated rack space. A second operation may be directed to removing the cables from the allocated rack space. A third operation may be directed to updating one or more records to indicate that the rack space previously occupied by the hardware device is now unoccupied, and thus available for additional hardware devices.

In a fifth example, a fifth workflow process structure 300 may be instantiated and executed each time an individual terminates their employment at the enterprise organization. A first operation may be directed to archiving any employment records associated with the individual. A second operation may be directed to disabling any credentials that were previously used by the individual to access computing devices associated with the enterprise organization. A third operation may be directed to physically removing any computing devices from a workstation previously used by the individual.

To instantiate a workflow process structure 300, workflow computing platform 110 may receive, at step 500, a selection of a workflow process structure 300 and associated data. Workflow computing platform 110 may receive the selection of the workflow process structure 300 and the data from an organization device, such as first organization device 102, second organization device 104, third organization device 106, or fourth organization device 108, and via an organization network, such as organization network 118. As noted above, each instantiation of workflow process structure 300 may include one or more operations, and the one or more operations may each be associated with an operation structure 200. As discussed above in reference to FIG. 3, the data elements that are needed for the execution of the first operation in a workflow process structure 300 may be stored in an operation structure associated with the first operation during an instantiation of and prior to an execution of workflow process structure 300. For example, a first operation of the instantiated workflow process structure 300 may require two data elements in order to execute. These two data elements may be received at step 500.

At step 501, workflow computing platform 110 may assign a request ID to the instantiation of the workflow process structure 300. The request ID assigned to the instantiation of the workflow process structure 300 may be any unique identifier that may be used to identify the instantiation of the workflow process structure 300. At step 503, workflow computing platform 110 may propagate the instantiation of workflow process structure 300 with the data received at step 500. As discussed in the above example with reference to step 500, workflow computing platform 110 may receive two data elements that are required by a first operation of the instantiated workflow process structure 300. At step 503, workflow computing platform 110 may store a first data element of the two received data elements in data field 206a of a first operation structure 200 associated with the first operation, and may store a second data element of the two received data elements in data field 206bf of the first operation structure 200 associated with the first operation.

At step 505, workflow computing platform 110 may update the status of the instantiated workflow process structure 300. Workflow computing platform 110 may maintain an internal record of a current status of each instantiated workflow process structure 300. The internal record may be maintained in workflow database 115. The internal record may indicate, for each instantiated workflow process structure 300, whether execution of the instantiated workflow process structure 300 is pending (i.e. awaiting execution), active (i.e. currently being executed), or complete (i.e. execution has been completed). At step 505, workflow computing platform 110 may update the status of the instantiated workflow process structure 300 to "pending". At step 507, workflow computing platform 110 may store the instantiated workflow process structure 300 in workflow database 115.

Figure 6:
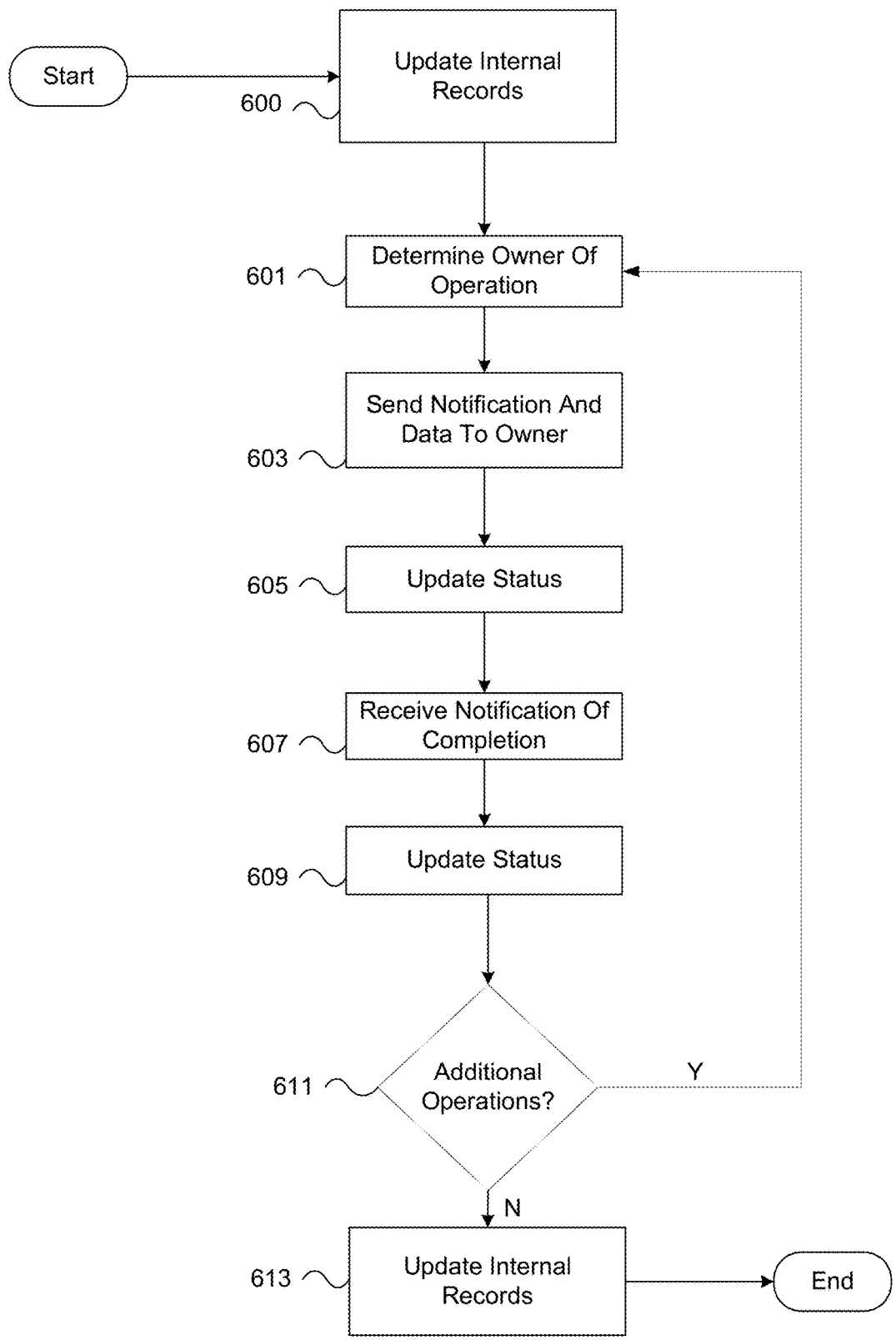
FIG. 6 depicts an illustrative method for executing an instantiated workflow process structure in accordance with one or more aspects described herein.

FIG. 6 depicts an illustrative method for executing an instantiated workflow process structure 300. At step 600, workflow computing platform 110 may update an internal record associated with the instantiated workflow process structure 300 and stored in workflow database 115. As discussed above in reference to FIG. 5, workflow computing platform 110 may maintain an internal record of a current status of each instantiated workflow process structure 300. The internal records may indicate whether each instantiated workflow process structure is pending, active, or complete. At step 600, workflow computing platform 110 may update the status of instantiated workflow process structure 300 within the internal record stored in workflow database 115 to "active." Workflow computing platform 110 may further update the internal record of instantiated workflow process structure 300 to include a current date and time (i.e. the start time of the execution of instantiated workflow process structure 300).

At step 601, workflow computing platform 110 may determine the owner of an operation within workflow process structure 300 that is to be executed during the execution of workflow process structure 300. Information identifying the source of any necessary input data for the operation may be specified within the operation. Information identifying the destination of output data generated by the operation once it has executed may be specified within the operation. The operation may be associated with an operation structure 200, which may be stored in workflow database 115. Data field 203 of the operation structure 200 may indicate an operation owner associated with operation structure 200. An operation owner may be an individual associated with the enterprise organization or a team associated with the enterprise organization. The individual or team may be responsible for completion of the operation associated with operation structure 200. Workflow computing platform 110 may determine the owner of the operation within workflow process structure 300 that is to be executed during the execution of workflow process structure 300 by extracting the information from data field 203 of the operation structure 200 stored in workflow database 115.

At step 603, workflow computing platform 110 may trigger execution of an operation by transferring a notification (or message) to the owner of the operation within workflow process structure 300 that is to be executed during the execution of workflow process structure 300. The notification (or message) may be transferred to one or more organization devices associated with the owner of the operation, such as one or more of first organization device 102, second organization device 104, third organization device 106, and fourth organization device 108. The notification (or message) may be transferred via one or more networks, such as organization network 117.

The notification (or message) may include the identification information from data field 201 of the operation structure 200 associated with the operation within workflow process structure 300 that is to be executed during the execution of workflow process structure 300. If the operation in the instantiated workflow process structure 300 requires input data from output data of a previous operation in the instantiated workflow process structure 300, workflow computing platform 110 may include the required input data in the notification (or message) to the operation owner. Alternatively, or additionally, workflow computing platform 110 may store the required data within the operation structure 200 associated with the operation (i.e. within data field 206 of the operation structure). Alternatively, or additionally, workflow computing platform 110 may store the required data within a central server, such as organization server 120. The team owner may then access the required data from organization server 120 via one or more organization devices, such as second organization device 104 and one or more organization networks, such as organization network 117.

The notification (or message) may indicate to the operation owner that execution of the operation may begin. The operation owner may then execute the operation. The operation owner may extract any data needed to execute the operation (for example, output data from a previously executed operation) from the notification (or message), from the data stored in data field 206 of the operation structure 200 (wherein operation structure 200 is associated with the operation and stored in workflow database 115), or from organization server 120. The operation may be executed by the operation owner via one or more computing devices associated with the organization, such as first organization device 102, second organization device 104, third organization device 106, and fourth organization device 108. Execution of the operation may result in the storing of output data to date field 208 of the operation structure 200 associated with the operation and stored in workflow database 115.

Once workflow computing platform 110 has transferred a notification (or message) and any input data to the operation owner, workflow computing platform 110 may update, at step 605, a status of the operation within workflow process structure 300 that is to be executed during the execution of workflow process structure 300. As discussed above in reference to FIG. 5, workflow computing platform 110 may maintain, in workflow database 115, an internal record of a current status of each instantiated workflow process structure 300. Workflow computing platform 110 may further maintain, in workflow database 115, an internal record of a current status of each operation in each instantiated workflow process structure 300. The internal records of the operations may indicate, for each operation in each instantiated workflow process structure 300, whether that operation is pending (i.e. awaiting execution), active (i.e. currently executing), or complete (i.e. execution has been completed). At step 605, workflow computing platform 110 may update the status of the operation within workflow process structure 300 that is to be executed during the execution of workflow process structure 300 to indicate that it is "active."

Once execution of the operation is complete, workflow computing platform 110 may receive a notification (or message) from the operation owner at step 607. The notification (or message) may indicate that the operation has been completed. The notification (or message) may further include information associated with any output data generated by the execution of the operation. For example, the notification (or message) may include an identification of the data fields of the operation structure 200 in which output data has been stored. Additionally, or alternatively, the notification (or message) may indicate that the output data generated by the execution of the operation has been stored on central server 120. Additionally, or alternatively, the notification (or message) may include the output data generated by the execution of the operation. This information may be used by workflow computing platform 110 if any subsequent operations require the data output by the operation. At step 609, workflow computing platform 110 may update the status of the operation within the internal record maintained for the operation within workflow database 115 to "complete."

At step 611, workflow computing platform 110 may determine if there are additional operations to be executed within the instantiated workflow process structure 300. If, at step 611, workflow computing platform 110 determines that there is at least one additional operation to be executed, processing may return to step 601, and the at least one additional operation may be executed using the process described above in reference to steps 601-609. If, at step 611, workflow computing platform 110 determines that there are no additional operations to be executed, workflow computing platform 110 may, at step 613, update the internal record of the instantiation of workflow process structure 300 stored in workflow database 115. Workflow computing platform 110 may update the status of the execution of the instantiated workflow process structure 300 to indicate that it is "complete." Workflow computing platform 110 may further update the internal record to include the current date and time (i.e. the completion date and time of the execution of instantiated workflow process structure 300).

Each instantiation of workflow process structure 300 may include one or more operations, and the one or more operations may each be associated with an operation structure 200. Therefore, the execution of an instantiated workflow process structure 300 may include the execution of the one or more operations. As is shown in FIG. 6, steps 601-611 are repeated each time an operation within instantiated workflow process structure 300 is executed. As discussed above in reference to FIG. 4A, the operation owner for each operation within a workflow process structure 300 may be the same or different. Therefore, each iteration of steps 601-611 may be performed in reference to a different operation owner. For example, a first instantiated workflow process structure 300 may include three operations. A first operation of the three operations may be associated with a first operation owner. The first operation owner may be associated with a first organization device. A second operation of the three operations may be associated with a second operation owner. The second operation owner may be associated with a second organization device. A third operation of the three operations may be associated with a third operation owner. The third operation owner may be associated with a third organization device. The first operation owner, the second operation owner, and the third operation owner may be the same or may be different. The first organization device, second organization device, and third organization may be the same or different.

In this example, steps 601-611 may be performed for the first operation. That is, at step 601, workflow computing platform 110 may determine, from a first operation structure 200 associated with the first operation, that the first operation owner is the owner of the first operation. At step 603, workflow computing platform 110 may trigger execution of the first operation by transferring a notification (or message) and data for the first operation to the first organization device associated with the first operation owner. At step 605, workflow computing platform 110 may update the status of the first operation. At step 607, workflow computing platform 110 may receive a notification (or message) of completion from the first organization device associated with the first operation owner. At step 609, workflow computing platform 110 may update the status of the first operation and at step 611, workflow computing platform 110 may determine that the second operation is to be executed.

In this example, steps 601-611 may then be performed for the second operation. That is, at step 601, workflow computing platform 110 may determine, from a second operation structure 200 associated with the second operation, that the second operation owner is the owner of the second operation. At step 603, workflow computing platform 110 may trigger execution of the second operation by transferring a notification (or message) and data for the second operation to the second organization device associated with the second operation owner. At step 605, workflow computing platform 110 may update the status of the second operation. At step 607, workflow computing platform 110 may receive a notification (or message) of completion from the second organization device associated with the second operation owner. At step 609, workflow computing platform 110 may update the status of the second operation and at step 611, workflow computing platform 110 may determine that the third operation is to be executed.

In this example, steps 601-611 may then be performed for the third operation. That is, at step 601, workflow computing platform 110 may determine, from a third operation structure 200 associated with the third operation, that the third operation owner is the owner of the third operation. At step 603, workflow computing platform 110 may trigger execution of the third operation by transferring a notification (or message) and data for the third operation to the third organization device associated with the third operation owner. At step 605, workflow computing platform 110 may update the status of the third operation. At step 607, workflow computing platform 110 may receive a notification (or message) of completion from the third organization device associated with the third operation owner. At step 609, workflow computing platform 110 may update the status of the third operation and at step 611, workflow computing platform 110 may determine that the third operation is to be executed. At step 611, workflow computing platform 110 may determine that no additional operations need to be executed. At step 611, workflow computing platform 110 may update the internal record of the instantiated workflow process structure 300 to "complete."

FIG. 7 depicts an example control screen 700 that may be generated by workflow computing platform 110. The control screen 700 may be used to track and monitor all instantiated workflow process structures 300 ("workflows") that are pending execution, currently executing, or have completed execution. The control screen 700 may be displayed one or more computing devices associated with the organization, such as first organization device 102, second organization device 104, third organization device 106, and fourth organization device 108.

The control screen 700 may include a series of columns 702-716 that each provide information for the workflows listed in rows 701-705 of control screen 700. Each of the workflows listed in rows 701-705 of control screen 700 may be an instantiation of a workflow process structure 300 ("workflow"). Column 702 of control screen 700 may include workflow index information for each of the workflows listed in rows 701-705 of control screen 700. As noted above in reference to FIG. 3, each instance of workflow process structure 300 may include a workflow index stored in data field 308 of workflow process structure 300 that may be a unique identifier of that instance workflow process structure 300. The workflow index information for each of the workflows listed in rows 701-705 of control screen 700 may be extracted from the workflow index stored in data field 308 of the workflow process structure 300 associated with that workflow.

Column 704 of control screen 700 may include the request ID associated with each workflow listed in in rows 701-705 of control screen 700. The request ID may have been previously assigned to each workflow during instantiation (discussed in step 501 of FIG. 5). Workflow computing platform 110 may extract this information and store it in column 704 for each workflow. Column 706 of control screen 700 may indicate the current status of each workflow listed in in rows 701-705 of control screen 700. As discussed above in reference to FIG. 5, workflow computing platform 110 may maintain an internal record of a current status of each instantiated workflow process structure 300. The internal records may indicate whether each instantiated workflow process structure is pending, active, or complete. Workflow computing platform 110 sets the status of each workflow to "pending" during instantiation (discussed in reference to step 505 of FIG. 5). Workflow computing platform 110 further updates the status of each workflow once execution of the workflow begins (discussed in reference to step 600 of FIG. 6) and when execution of the workflow is completed (discussed in reference to step 613 of FIG. 6). The status of each workflow listed in rows 701-705 of control screen 700 may be extracted from the internal records maintained by workflow computing platform 110 in the workflow database 115 and presented in column 706 of control screen 700.

Columns 708 and 710 of control screen 700 may include the operation ID and the operation owner of the currently executing operation of each workflow listed in in rows 701-705 of control screen 700 that has a current status of "active." Each workflow listed in in rows 701-705 of control screen 700 may include one or more operations, and the one or more operations may each be associated with an operation structure 200. Workflow computing platform 110 may determine, for each workflow listed in rows 701-705 of control screen 700 that has a current status of "active," the operation ID and the operation owner of the operation that is currently executing for that workflow. Workflow computing platform 110 may determine the operation ID of a currently executing operation from data field 201 of the operation structure 200 associated with the currently executing operation. Workflow computing platform 110 may determine the operation owner of a currently executing operation from data field 203 of the operation structure 200 associated with the currently executing operation. If a workflow in one of rows 701-705 of control screen 700 has a workflow status of "complete" or "pending," columns 708 and 710 may be left blank, or may display an indication that this column is not applicable for that workflow.

Column 712 of control screen 700 may indicate the start date and time of each workflow listed in rows 701-705. As noted above in reference to FIG. 6, workflow computing platform 110 may update an internal record associated with an instantiated workflow process structure 300 to include a current date and time when execution of instantiated workflow process structure 300 begins. Workflow computing platform 110 may extract this information from the internal records associated with each workflow, and display it in column 712 of control screen 700. If a workflow in one of rows 701-705 of control screen 700 has a workflow status of "pending," column 712 may be left blank, or may display an indication that this column is not applicable for that workflow.

Column 714 of control screen 700 may indicate the completion date and time of each workflow listed in in rows 701-704 that is "complete," and an estimated completion date and time of each workflow listed in rows 701-705 that is "active." If a workflow displayed in one of rows 701-705 has a current workflow status of "pending" in column 706, then execution of the workflow has not begun. Accordingly, column 714 for that workflow may be left blank, or may display an indication that this column is not applicable for that workflow (for example, an "N/A" (not applicable) may be displayed).

If a workflow displayed in one of rows 701-705 has a current workflow status of "complete," in column 706, then the data displayed in column 714 for that workflow may be the completion date and time of the execution of the workflow. As discussed above in reference to step 613 of FIG. 6, when execution of an instantiated workflow process structure 300 is complete, workflow computing platform 110 may update the internal record associated with the instantiated workflow process structure 300 to include the completion date and time of the execution. Workflow computing platform 110 may extract that data for each workflow displayed in one of rows 701-705 that has a current workflow status of "complete" and display the extracted data in column 714.

Each workflow listed in in rows 701-705 of control screen 700 may include one or more operations, and the one or more operations may each be associated with an operation structure 200. As discussed above in reference to FIG. 2, data field 205 of an operation structure 200 may indicate the estimated amount of time needed to complete execution of an operation associated with operation structure 200. For a first "active" workflow, workflow computing platform 110 may extract, for each operation in the first "active" workflow, the data from data field 205 of the operation structure 200 associated with that operation. Workflow computing platform 110 may then use the extracted data to compute the total amount of time needed to execute the first "active" workflow. If the first "active" workflow includes a plurality of operations that will all execute in series (i.e. the first "active" workflow has no operations that will begin executing in parallel), workflow computing platform 110 may compute the total amount of time needed to execute the first "active" workflow by summing the extracted data. If the first "active" workflow includes one or more operations that will begin execution in parallel, workflow computing platform 110 may adjust the computation to account for parallel execution.

Workflow computing platform 110 may then use both the computed total amount of time needed to execute the first "active" workflow and the data stored in column 712 of row 701 (the start date and time of the execution of the workflow) for the first "active" workflow to determine an estimated completion date and time. Workflow computing platform 110 may display this information in column 714 of the row associated with the first "active" workflow. Workflow computing platform 110 may then repeat this computation for any other workflows displayed in control screen 700 that have a current workflow status of "active."

Column 716 of control screen 700 may include the output data of each workflow. Each workflow listed in in rows 701-705 of control screen 700 may include one or more operations, and the one or more operations may each be associated with an operation structure 200. Data field 208 of each operation structure 200 indicates the output data generated when the operation associated with that operation structure 200 is executed. Workflow computing platform 110 may aggregate the output data from data field 208 of each operation structure associated with an operation in each workflow, and display the aggregated data in column 716.

Figure 8:
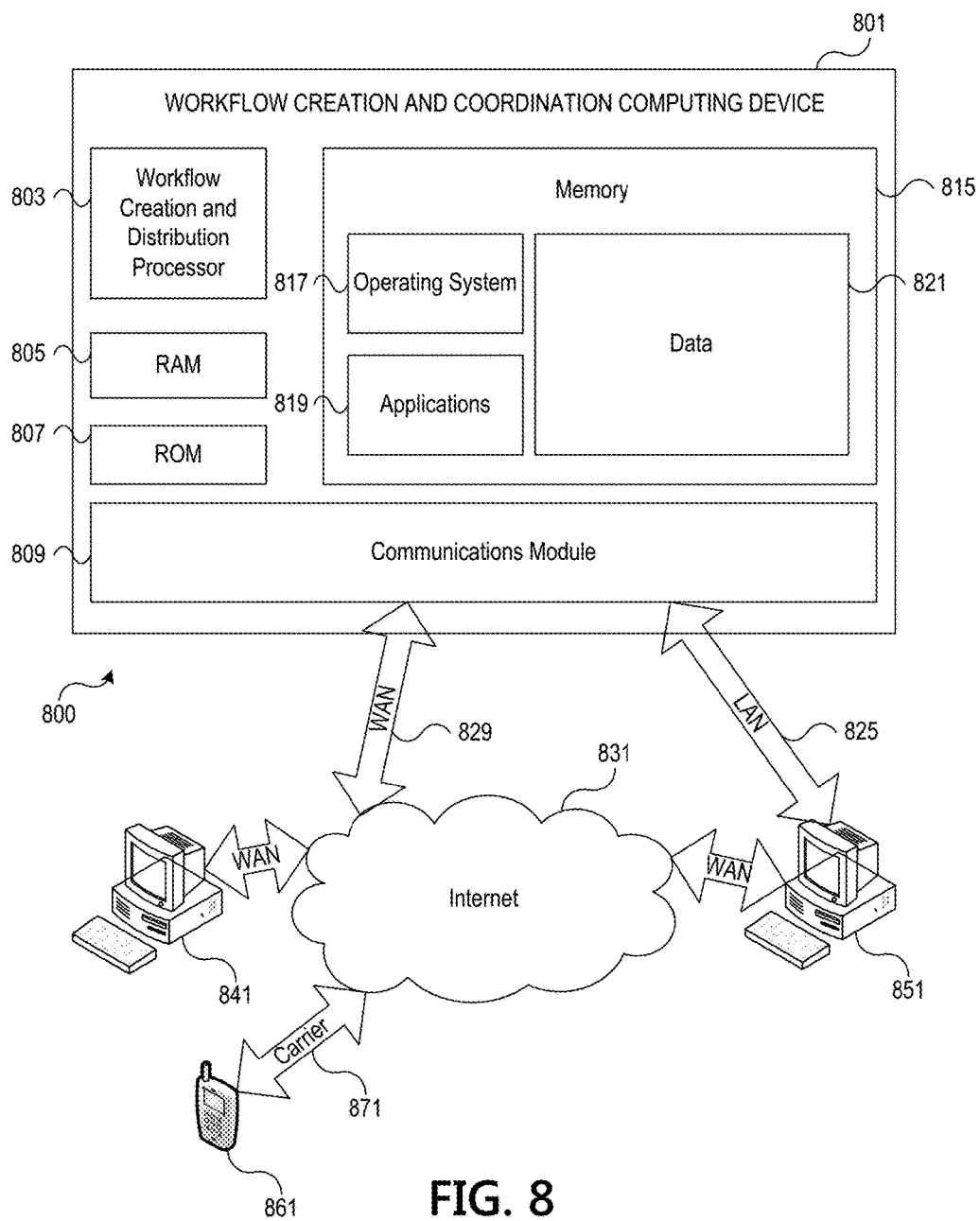
FIG. 8 depicts an illustrative operating environment in which various aspects of the disclosure may be implemented in accordance with one or more example embodiments.

FIG. 8 depicts an illustrative workflow creation and distribution environment in which various aspects of the present disclosure may be implemented in accordance with one or more example embodiments. Referring to FIG. 8, computing system environment 800 may be used according to one or more illustrative embodiments. Computing system environment 800 is one example of a suitable computing environment. Computing system environment 800 should not be interpreted as having any dependency or requirement relating to any one or combination of components shown in illustrative computing system environment 800.

Computing system environment 800 may include workflow creation and coordination computing device 801 having workflow creation and coordination processor 803 for controlling overall operation of computing device 801 and its associated components, including random-access memory (RAM) 805, read-only memory (ROM) 807, communications module 809, and memory 815. Workflow creation and coordination computing device 801 may include a variety of computer readable media. Computer readable media may be any available media that may be accessed by workflow creation and coordination computing device 801, may be non-transitory, and may include volatile and nonvolatile, removable and non-removable media implemented in any method or technology for storage of information such as computer-readable instructions, object code, data structures, modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by workflow creation and coordination computing device 801.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on workflow creation and coordination computing device 801. Such a processor may execute computer-executable instructions stored on a computer-readable medium.

Software may be stored within memory 815 and/or storage to provide instructions to workflow creation and coordination processor 803 for enabling workflow creation and coordination computing device 801 to perform various functions. For example, memory 815 may store software used by workflow creation and coordination computing device 801, such as operating system 817, application programs 819, and associated database 821. Also, some or all of the computer executable instructions for workflow creation and coordination computing device 801 may be embodied in hardware or firmware. Although not shown, RAM 805 may include one or more applications representing the application data stored in RAM 805 while workflow creation and coordination computing device 801 is on and corresponding software applications (e.g., software operations) are running on workflow creation and coordination computing device 801.

Communications module 809 may include a microphone, keypad, touch screen, and/or stylus through which a user of workflow creation and distribution environment workflow creation and coordination computing device 801 may provide input, and may also include one or more of a speaker for providing audio output and a video display device for providing textual, audiovisual and/or graphical output. Workflow creation and distribution computing device 800 may also include optical scanners (not shown). Exemplary usages include scanning and converting paper documents, e.g., correspondence, receipts, and the like, to digital files.

Workflow creation and coordination computing device 801 may operate in a networked environment supporting connections to one or more remote computing devices, such as computing devices 841, 851, and 861. Computing devices 841, 851, and 861 may be personal computing devices or servers that include any or all of the elements described above relative to workflow creation and coordination computing device 801. Computing device 861 may be a mobile device (e.g., smart phone) communicating over wireless carrier channel 871.

The network connections depicted in FIG. 8 may include local area network (LAN) 825 and wide area network (WAN) 829, as well as other networks. When used in a LAN networking environment, workflow creation and coordination computing device 801 may be connected to LAN 825 through a network interface or adapter in communications module 809. When used in a WAN networking environment, workflow creation and coordination computing device 801 may include a modem in communications module 809 or other means for establishing communications over WAN 829, such as Internet 831 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other special purpose computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 9:
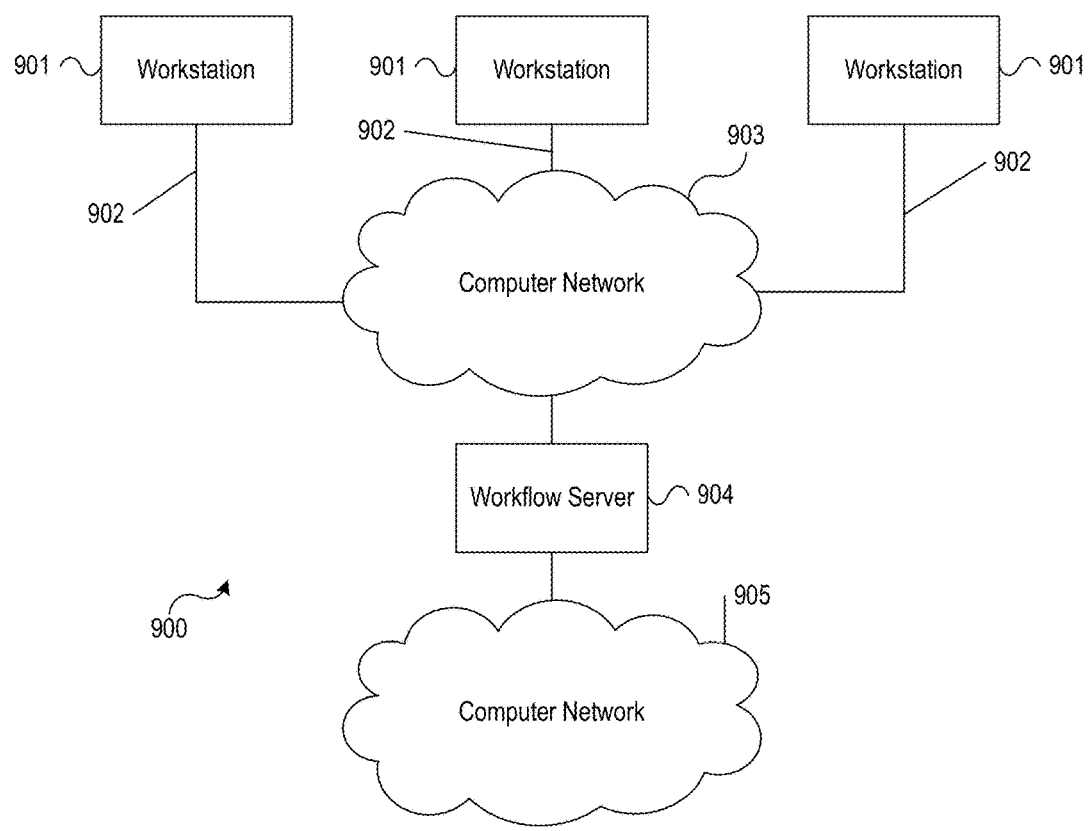
FIG. 9 depicts an illustrative block diagram of workstations and servers that may be used to implement the processes and functions of certain aspects of the present disclosure in accordance with one or more example embodiments.

FIG. 9 depicts an illustrative block diagram of workstations and servers that may be used to implement the processes and functions of certain aspects of the present disclosure in accordance with one or more example embodiments. Referring to FIG. 9, illustrative system 900 may be used for implementing example embodiments according to the present disclosure. As illustrated, system 900 may include one or more workstation computers 901. Workstation 901 may be, for example, a desktop computer, a smartphone, a wireless device, a tablet computer, a laptop computer, and the like. Workstations 901 may be local or remote, and may be connected by one of communications links 902 to computer network 903 that is linked via communications link 905 to workflow server 904. In system 900, workflow server 904 may be any suitable server, processor, computer, or data processing device, or combination of the same. Workflow server 904 may be used to process the instructions received from, and the transactions entered into by, one or more participants.

Computer network 903 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 902 and 905 may be any communications links suitable for communicating between workstations 901 and workflow server 904, such as network links, dial-up links, wireless links, hard-wired links, as well as network types developed in the future, and the like.

One or more aspects of the disclosure may be embodied in computer-usable data or computer-executable instructions, such as in one or more modules, executed by one or more computers or other devices to perform the operations described herein. Generally, modules include routines, programs, objects, components, data structures, and the like that perform particular operations or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
    at least one processor;
    a communication interface; and
    memory storing computer-readable instructions that, when executed by the at least one processor, cause the system to:
        receive, from a first computing device, a first operation for a workflow, the first operation comprising first operation information;
        generate, in a central server, a workflow structure associated with the workflow;
        store, in the workflow structure, associated with the workflow and stored in the central server, the first operation and the first operation information;
        receive, from the first computing device, a second operation for the workflow, the second operation comprising second operation information;
        store, in the workflow structure associated with the workflow and stored in the central server, the second operation and the second operation information;
        determine, based on one or more dependencies between the first operation and the second operation, a sequence of execution for the first operation and the second operation;
        output, to the first computing device, visualization data comprising the sequence of execution;
        trigger, based on the sequence of execution, execution of the first operation, wherein execution of the first operation generates first output data;
        apply the first output data to a condition of the second operation to determine whether the condition of the second operation is associated with a first value or a second value;
        determine an operation owner of the second operation based on whether the condition of the second operation is associated with the first value or the second value; and
        output, to a second computing device associated with the operation owner, a first notification associated with the second operation.

2. The system of claim 1, wherein the second operation information indicates that the first output data from the execution of the first operation is to be used as input data for an execution of the second operation.

3. The system of claim 2, wherein the memory stores additional computer-readable instructions that, when executed by the at least one processor, further cause the system to determine, based on the second operation information indicating that the first output data from the execution of the first operation is to be used as input data for the execution of the second operation, that the second operation is dependent on the first operation.

4. The system of claim 1, wherein the memory stores additional computer-readable instructions that, when executed by the at least one processor, further cause the system to trigger the execution of the first operation by sending a second notification to a third computing device.

5. The system of claim 4, wherein the memory stores additional computer-readable instructions that, when executed by the at least one processor, further cause the system to:
 receive, from the third computing device, a third notification indicating that execution of the first operation is complete; and
 trigger, in response to receiving the third notification, an execution of the second operation by sending the first notification to the second computing device.

6. The system of claim 5, wherein the second computing device and the third computing device are different computing devices.

7. The system of claim 1, wherein the memory stores additional computer-readable instructions that, when executed by the at least one processor, further cause the system to:
 receive, from the first computing device, a third operation for the workflow, the third operation comprising third operation information;
 store, in the workflow structure associated with the workflow and stored in the central server, the third operation and the third operation information;
 determine, based on one or more dependencies between the first operation, the second operation, and the third operation, an updated sequence of execution for the first operation, the second operation, and the third operation; and
 output, to the first computing device, visualization data comprising the updated sequence of execution.

8. The system of claim 7, wherein the second operation information indicates that the first output data from the execution of the first operation is to be used as input data for an execution of the second operation, and wherein the third operation information indicates that the first output data from the execution of the first operation is to be used as input data for an execution of the third operation.

9. The system of claim 8, wherein the memory stores additional computer-readable instructions that, when executed by the at least one processor, further cause the system to determine, based on the second operation information indicating that the first output data from the execution of the first operation is to be used as input data for the execution of the second operation and further based on the third operation information indicating that the first output data from the execution of the first operation is to be used as input data for the execution of the third operation, that the second operation and the third operation are each dependent on the first operation.

10. The system of claim 9, wherein the memory stores additional computer-readable instructions that, when executed by the at least one processor, further cause the system to determine, based on the second operation information indicating that the first output data from the execution of the first operation is to be used as input data for the execution of the second operation and further based on the third operation information indicating that the first output data from the execution of the first operation is to be used as input data for the execution of the third operation, that the second operation and the third operation may be executed in parallel.

11. A method, comprising:
 at a first computing platform comprising at least one processor, a communication interface, and memory:
  receiving, from a first computing device, a first operation for a workflow, the first operation comprising first operation information;
  generating, in a central server, a workflow structure associated with the workflow;
  storing, in the workflow structure associated with the workflow and stored in the central server, the first operation and the first operation information;
  receiving, from the first computing device, a second operation for the workflow, the second operation comprising second operation information;
  storing, in the workflow structure associated with the workflow and stored in the central server, the second operation and the second operation information;
  determining, based on one or more dependencies between the first operation and the second operation, a sequence of execution for the first operation and the second operation;
  outputting, to the first computing device, visualization data comprising the sequence of execution;
  triggering, based on the sequence of execution, execution of the first operation, wherein execution of the first operation generates first output data;
  applying the first output data to a condition of the second operation to determine whether the condition of the second operation is associated with a first value or a second value;
  determining an operation owner of the second operation based on whether the condition of the second operation is associated with the first value or the second value; and
  outputting, to a second computing device associated with the operation owner, a first notification associated with the second operation.

12. The method of claim 11, wherein the second operation information indicates that the first output data from the execution of the first operation is to be used as input data for an execution of the second operation.

13. The method of claim 12, further comprising determining, based on the second operation information indicating that the first output data from the execution of the first operation is to be used as input data for the execution of the second operation, that the second operation is dependent on the first operation.

14. The method of claim 11, further comprising triggering the execution of the first operation by sending a second notification to a third computing device.

15. The method of claim 14, further comprising:
 receiving, from the third computing device, a third notification indicating that execution of the first operation is complete; and
 triggering, in response to receiving the third notification, an execution of the second operation by sending the first notification to the second computing device,
 wherein the second computing device and the third computing device are different computing devices.

16. The method of claim 11, further comprising:
 receiving, from the first computing device, a third operation for the workflow, the third operation comprising third operation information;

storing, in the workflow structure associated with the workflow and stored in the central server, the third operation and the third operation information;

determining, based on one or more dependencies between the first operation, the second operation, and the third operation, a re-ordered sequence of execution for the first operation, the second operation, and the third operation; and outputting, to the first computing device, visualization data comprising the re-ordered sequence of execution.

17. The method of claim 16, wherein the second operation information indicates that the first output data from the execution of the first operation is to be used as input data for an execution of the second operation, and wherein the third operation information indicates that the first output data from the execution of the first operation is to be used as input data for an execution of the third operation.

18. The method of claim 17, further comprising determining, based on the second operation information indicating that the first output data from the execution of the first operation is to be used as input data for the execution of the second operation, and further based on the third operation information indicating that the first output data from the execution of the first operation is to be used as input data for the execution of the third operation, that the second operation and the third operation are each dependent on the first operation.

19. The method of claim 18, further comprising determining, based on the second operation information and the third operation information, that the second operation and the third operation may be executed in parallel.

20. One or more non-transitory computer-readable media storing instructions that, when executed by a computer system comprising at least one processor and memory, cause the computer system to:

receive, from a first computing device, a first operation for a workflow, the first operation comprising first operation information;

generate, in a central server, a workflow structure associated with the workflow;

store, in the workflow structure associated with the workflow and stored in the central server, the first operation and the first operation information;

receive, from the first computing device, a second operation for the workflow, the second operation comprising second operation information;

store, in the workflow structure associated with the workflow and stored in the central server, the second operation and the second operation information;

determine, based on one or more dependencies between the first operation and the second operation, a sequence of execution for the first operation and the second operation;

output, to the first computing device, visualization data comprising the sequence of execution;

trigger, based on the sequence of execution, execution of the first operation, wherein execution of the first operation generates first output data;

apply the first output data to a condition of the second operation to determine whether the condition of the second operation is associated with a first value or a second value;

determine an operation owner of the second operation based on whether the condition of the second operation is associated with the first value or the second value; and output, to a second computing device associated with the operation owner, a first notification associated with the second operation.

* * * * *